United States Patent

Yaginuma et al.

[11] Patent Number: 5,848,320
[45] Date of Patent: Dec. 8, 1998

[54] COPYING APPARATUS CAPABLE OF HANDLING ORIGINAL HAVING PROTRUDING PORTION

[75] Inventors: Masatoshi Yaginuma, Tokyo; Shizuo Hasegawa, Urayasu; Hiroyuki Ichikawa, Kawasaki; Hideaki Shimizu, Yokohama; Masao Watanabe, Kawasaki; Hiroyuki Yaguchi, Inagi; Atsushi Matsumoto, Kawasaki; Yoshinori Abe, Tama; Hiroshi Kaburagi, Yokohama; Yasuhiro Takiyama; Hirokazu Kodama, both of Kawasaki, all of Japan

[73] Assignee: Canon Kabushiki Kaisha, Tokyo, Japan

[21] Appl. No.: 623,382

[22] Filed: Mar. 27, 1996

[30] Foreign Application Priority Data

Mar. 29, 1995 [JP] Japan ................................. 7-096257
Dec. 27, 1995 [JP] Japan ................................. 7-340784

[51] Int. Cl.⁶ ..................................................... G03G 15/00
[52] U.S. Cl. .............................. 399/45; 399/363; 399/376
[58] Field of Search .............................. 399/45, 363, 370, 399/389, 376, 382, 403; 101/482

[56] References Cited

U.S. PATENT DOCUMENTS

| 4,763,161 | 8/1988 | Forest et al. | 399/382 |
| 4,924,265 | 5/1990 | Partilla et al. | 399/382 |
| 4,974,035 | 11/1990 | Rabb et al. | 399/364 |
| 5,130,757 | 7/1992 | Ito | 399/389 X |
| 5,452,062 | 9/1995 | Baldwin et al. | 399/382 |
| 5,481,353 | 1/1996 | Hicks et al. | 399/382 |

Primary Examiner—William J. Royer
Attorney, Agent, or Firm—Fitzpatrick, Cella, Harper & Scinto

[57] ABSTRACT

A copying apparatus includes a first cassette for stacking recording sheets each having a protruding portion, a second cassette for stacking recording sheets having no protruding portion, a detecting unit for detecting a protruding portion of an original to be copied, and a copy unit for copying an image of an original onto the recording sheet fed from the first cassette in the case where the protruding portion of the original is detected by the detecting unit and for copying the image of the original onto the recording sheet fed from the second cassette in the case where the protruding portion of the original is not detected by the detecting unit.

27 Claims, 24 Drawing Sheets

COPYING APPARATUS CAPABLE OF HANDLING ORIGINAL HAVING PROTRUDING PORTION

BACKGROUND OF THE INVENTION

1. Field of the Invention

The invention relates to a copying apparatus which can handle an original having a protruding portion.

2. Related Background Art

Hitherto, there is a copying apparatus with a document feeding apparatus. In such a conventional copying apparatus, when an original having a protruding portion (tab) as shown at reference numeral 400 in FIG. 4 is fed by the document feeding apparatus of the copying apparatus, there are cases such that since there is a portion that is longer than the ordinary one with respect to the feeding direction, such a long portion is erroneously detected as a remaining jam and, since the original is conveyed and stopped by using a rear edge of the original as a reference, the original is not correctly placed onto an original supporting glass plate of the copying apparatus. There is, consequently, a problem such that not only the portion of the tab but also a portion other than the tab cannot be correctly copied.

SUMMARY OF THE INVENTION

It is an object of the invention to provide a copying apparatus which can solve the above problems.

Another object of the invention is to provide a copying apparatus which can handle an original having a protruding portion.

The above and other objects and features of the present invention will become apparent from the following detailed description and the appended claims with reference to the accompanying drawings.

DETAILED DESCRIPTION OF THE PREFERRED EMBODIMENT

An embodiment according to the invention will now be described in detail hereinbelow with reference to the drawings.

Figure 1:
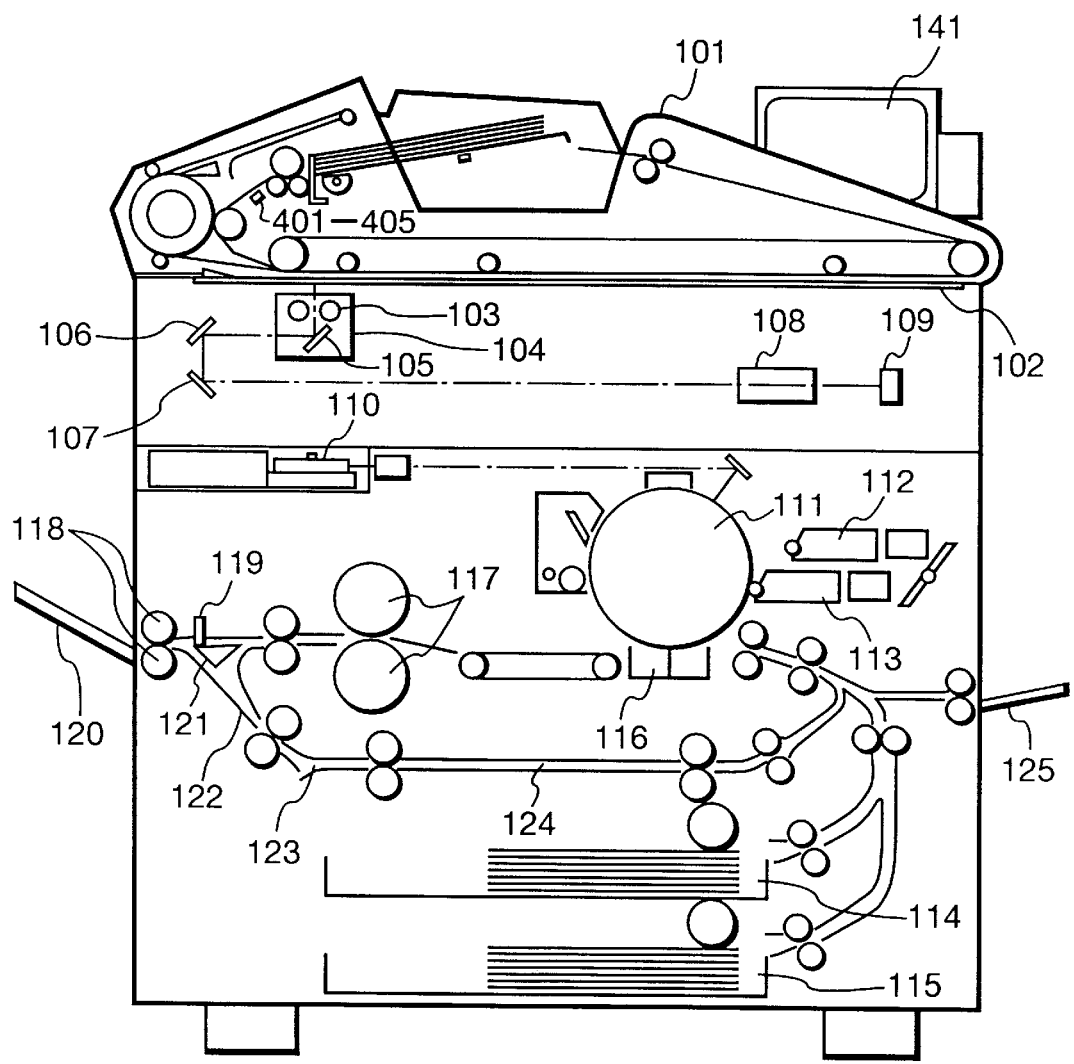
FIG. 1 is a cross sectional view showing a structure of a copying apparatus in a form of an embodiment.

FIG. 1 is a cross sectional view showing a structure of a copying apparatus according to the embodiment. In the diagram, reference numeral 101 denotes a document feeding apparatus as document feeding means for feeding set originals one by one or continuously feeding the originals every two originals to a predetermined position on an original supporting glass surface 102. Reference numerals 401 to 405 denote sensors for detecting a protruding portion of the original. The sensors 401 to 405 will be explained hereinlater. Reference numeral 104 denotes a scanner constructed by a lamp 103, a scanning mirror 105, and the like. When the original is put onto the original supporting glass surface 102 by the document feeding apparatus 101, the main body is reciprocatingly scanned in predetermined directions. A reflected light from the original is reflected by scanning mirrors 105 to 107 and passes through a lens 108 and is color separated by RGB color separation filters (not shown) and is formed as an image onto an image sensor unit 109.

Reference numeral 110 denotes an exposure control unit constructed by a laser scanner. The exposure control unit irradiates a light beam which was modulated on the basis of image data that is outputted from an image signal control unit 203 (refer to FIG. 2) of a controller unit (CONT) to a photosensitive material 111. Reference numerals 112 and 113 denote developing devices each for visualizing an electrostatic latent image formed on the photosensitive material 111 by a developing agent (toner) of a predetermined color. Reference numerals 114 and 115 denote recording sheet stacking units in each of which recording sheets of a fixed size are stacked and enclosed. The recording sheet is fed to a registration arranging position by the driving of a feed roller and is again fed in a state in which a timing for matching an image edge with an image that is formed on the photosensitive material 111.

Reference numeral 116 denotes a transfer separation charging device for transferring the toner image developed on the photosensitive material 111 to the recording sheet and, after that, separating the sheet from the photosensitive material 111; 117 is a fixing unit for fixing the toner image of the recording sheet sent through a conveying belt; 118 is a paper ejection rollers for ejecting and stacking the recording sheet after completion of an image formation onto a tray 120; and 121 is a direction flapper for switching the conveying direction of the recording sheet after completion of the image formation to a paper ejection port and an internal conveying path direction, thereby preparing for a process to form a multiple/two-sides image formation.

Figure 2:
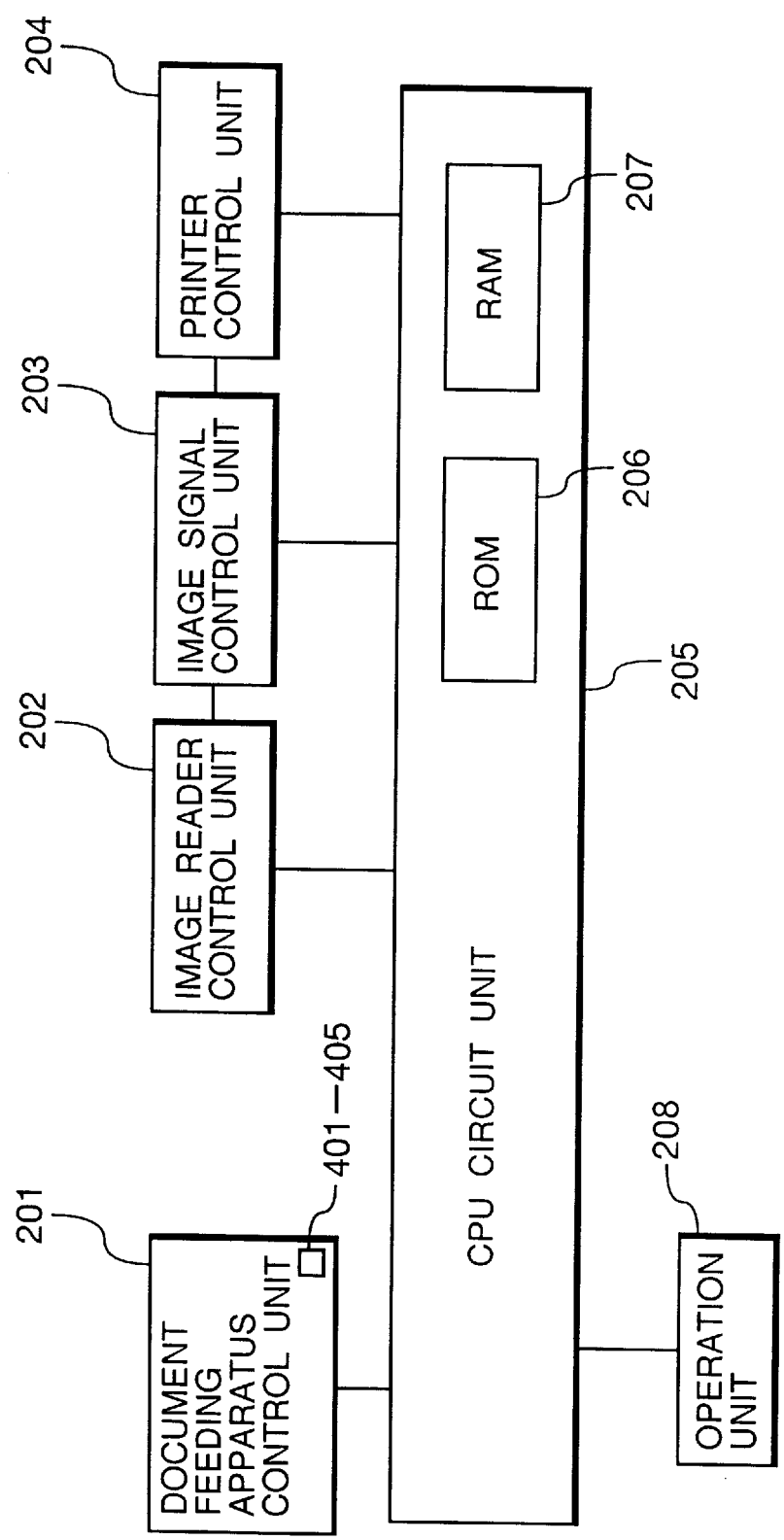
FIG. 2 is a block diagram of a controller unit for the copying apparatus.

FIG. 2 is a block diagram showing a construction of the controller unit (CONT) for the copying apparatus shown in FIG. 1. In the diagram, reference numeral 205 denotes a CPU circuit unit having therein an ROM 206, an RAM 207, and a peripheral circuit and integratedly controls each unit on the basis of control programs stored in the ROM 206.

Reference numeral 201 denotes an automatic document feeding apparatus control unit for controlling so as to feed the stacked originals one by one or to continuously feed the originals every two originals to a predetermined position on the original supporting glass surface 102. The control unit 201 also detects whether the stacked original is an original with a protruding portion or not. The detection about the original with the protruding portion will be further described hereinlater.

Reference numeral 202 denotes an image reader control unit which is constructed by the foregoing image sensor unit 109 or the like and outputs analogue image signals which were color separated by the RGB color separation filters (not shown) and were photoelectrically converted to an image signal control unit 203. Reference numeral 204 denotes a printer control unit for driving the exposure control unit 110 on the basis of a video signal which is outputted from the image signal control unit 203 and irradiating a light beam onto the photosensitive material 111.

Reference numeral 208 denotes an operation unit equipped with an operation panel having keys for setting a mode which is necessary for the image formation, a display, and the like.

In the above construction, the operation to form an image onto the recording sheet will now be described.

The image signal inputted to the image sensor unit 109, namely, the input signal from the image reader control unit 202 is processed by the image signal control unit 203 which is controlled by the CPU circuit unit 205 and is sent to the printer control unit 204. The signal inputted to the printer control unit 204 is converted into an optical signal by the internal exposure control unit 110 and is irradiated as a laser beam onto the photosensitive material 111 in accordance with the image signal. A latent image formed on the photosensitive material 111 by the irradiating light is developed by the developing device 112 or 113. The recording sheet is conveyed from the recording sheet cassette 114 or 115 at a timing matched with the latent image. The developed image mentioned above is transferred onto the recording sheet by the transfer unit 116. The transferred image is fixed onto the recording sheet by the fixing unit 117 and is ejected to the outside of the apparatus by the paper ejecting rollers 118. Reference numeral 125 denotes a manual paper feeding unit.

In the two-sides recording mode, when a paper ejection sensor 119 confirmed that the recording sheet has passed, the paper ejection rollers 118 are rotated in the direction opposite to the paper ejecting direction. At the same time, the flapper 121 is lifted up and the copied recording sheet is stored into a re-feeding unit 124 through conveying paths 122 and 123. In a backside recording operation which will be subsequently performed, the recording sheet enclosed in the re-feeding unit 124 is fed and an image is transferred onto the back surface.

In a multiple recording mode, the flapper 121 is lifted up and the copied recording sheet is stored into the re-feeding unit 124 through the conveying paths 122 and 123. In the multiple recording operation which will be subsequently performed, the recording sheet enclosed in the re-feeding unit 124 is fed and an image is multiple-transferred.

Figure 3:
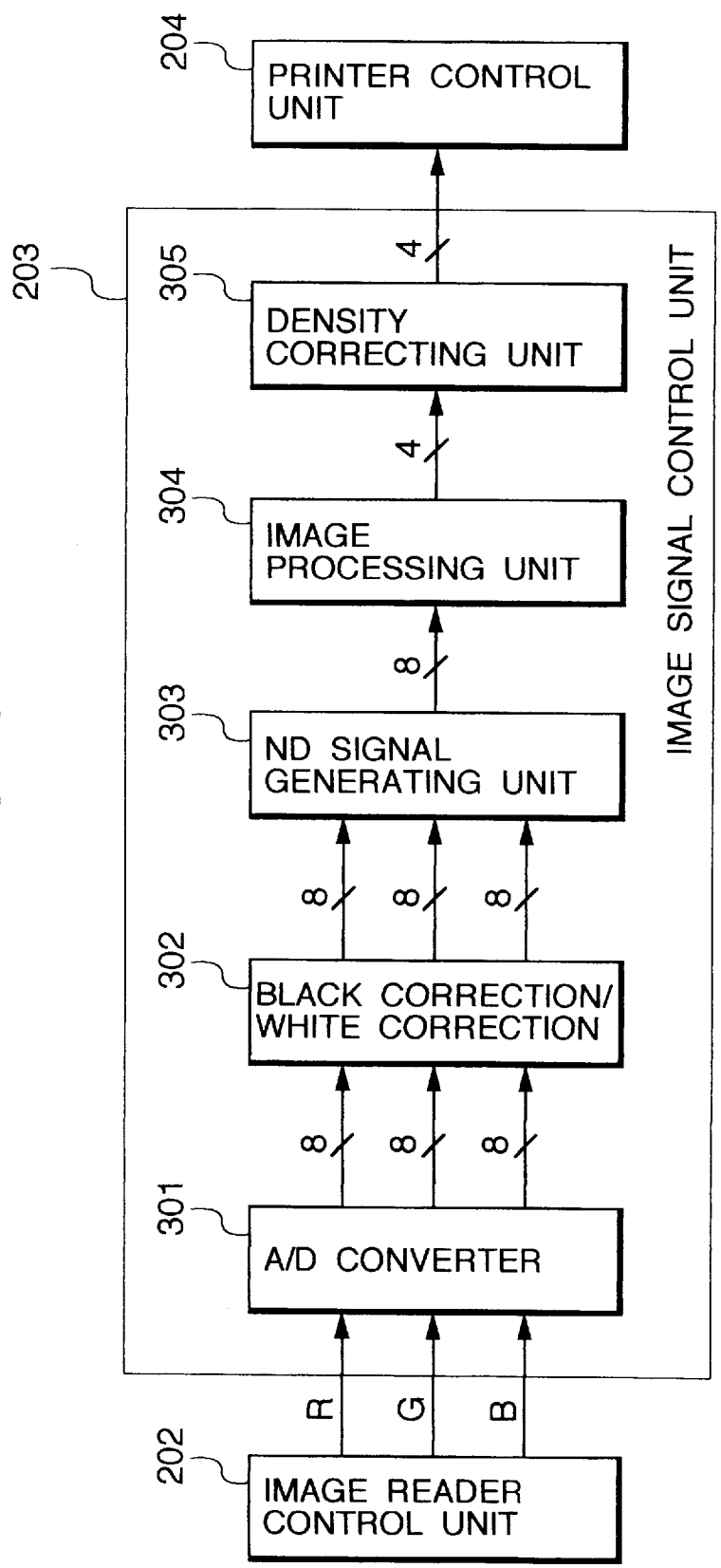
FIG. 3 is a block diagram showing a detailed construction of an image signal control unit.

FIG. 3 is a block diagram showing a detailed construction of the image signal control unit 203 shown in FIG. 2. In the diagram, the analogue image signals which were converted into the electric signals of RGB by the image reader control unit 202 are further converted into the digital signals by an A/D converter 301 (each signal of RGB consists of eight bits in the embodiment).

A shading correction is subsequently performed to the digital signals by a black correction/white correction unit 302. After that, the signals of RGB are inputted to an ND signal generating unit 303. The ND signal generating unit 303 generates a luminance signal Dout from each of the signals of RGB in accordance with the following equation.

$Dout=(Rin+Gin+Bin)/3$

The outputted luminance signal Dout is inputted to an image processing unit 304. In the image processing unit 304, an image process such as a variable magnification process (zooming process) for enlarging or reducing an image or the like is executed. After that, a luminance-density conversion is executed in a density correcting unit 305 and a density correction is performed in the printer. The resultant signals are sent to the printer control unit 204 of the laser printer.

Figure 4:
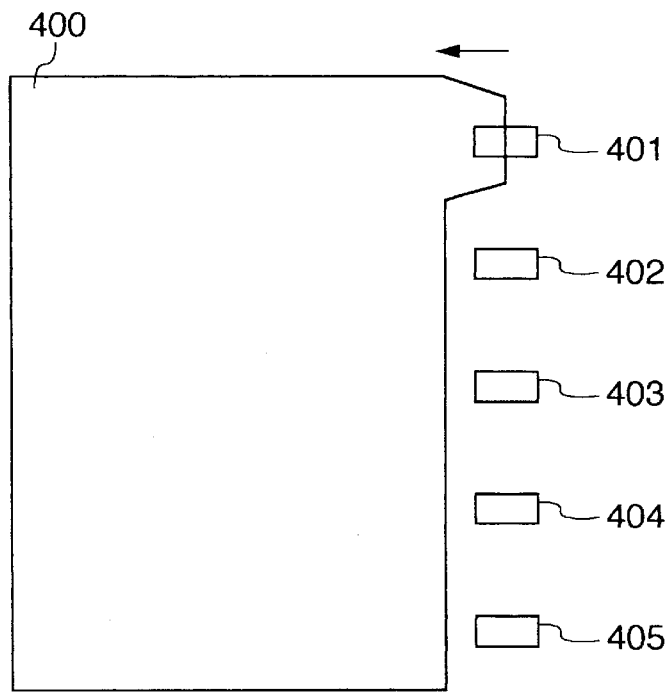
FIG. 4 is a diagram for explaining a detection of an original having a protruding portion.
Figure 5:
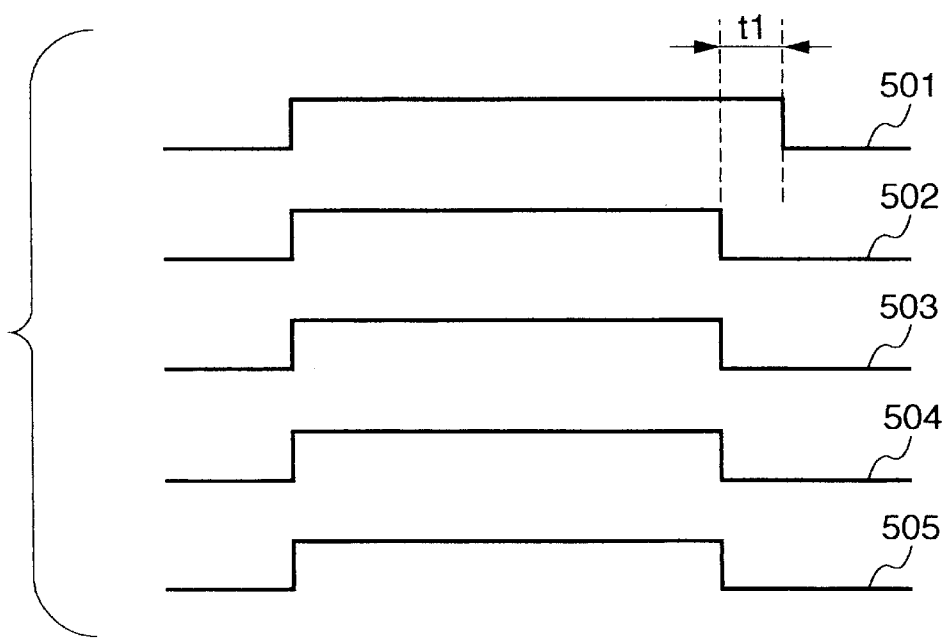
FIG. 5 is a diagram showing outputs of protruding portion sensors.

FIG. 4 is a diagram for explaining the detection of the original with the protruding portion. As shown in FIG. 4, it is now assumed that the five protruding portion sensors 401 to 405 are arranged on the conveying path of the document feeding apparatus 101 in the direction perpendicular to the conveying direction. If the original 400 having a protruding portion at a position as shown in FIG. 4 is fed in the direction shown by an arrow, signals of the protruding portion sensors 401 to 405 become signals 501 to 505 as shown in FIG. 5. The document feeding apparatus control unit 201 detects the existence and a position of the protruding portion and a size of the protruding portion in the conveying direction by a time difference t1 of the signals 501 to 505 and notifies to the CPU circuit unit 205. Since the shapes and sizes of the protruding portions of the original having the protruding portions are limited to a few kinds, by increasing the number of protruding portion sensors, the size in the direction perpendicular to the conveying direction of the protruding portion is detected. In accordance with the detection of such a protruding portion, the recording sheet having the protruding portion at the same position is selected and fed. In accordance with the detection of the protruding portion, the sheet having the protruding portion which was inserted into the manual paper feeding unit 125 can be also fed.

Figure 6A:
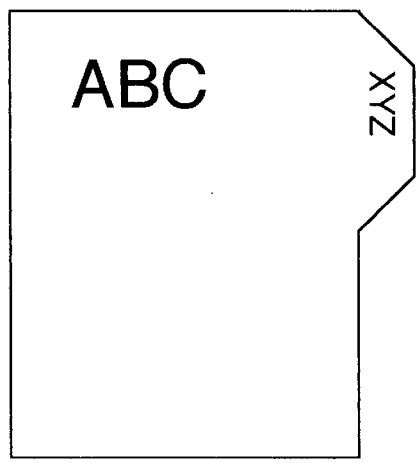
FIGS. 6A and 6B are diagrams showing an example of an image process.
Figure 6B:
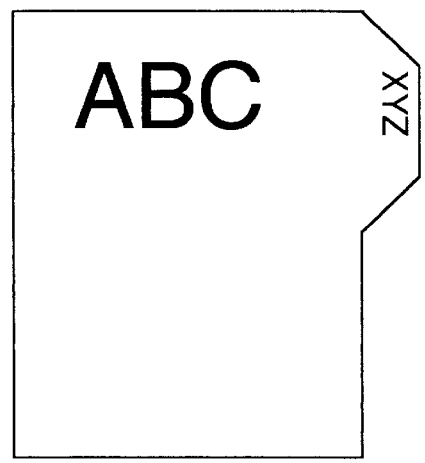

FIGS. 6A and 6B are diagrams showing an example of an image process which is executed in the image processing unit 304 mentioned above. FIG. 6A shows an original having a protruding portion before it is image processed. FIG. 6B shows a processing result which was subjected to the variable magnification process in accordance with a magnification set by the operator for the original. In the example, the variable magnification process is executed to only image data (ABC) in a region other than the protruding portion and the variable magnification process is not executed to image data (XYZ) in a region of the protruding portion. Namely, by processing so as to make the magnification different every region, a loss of the image data in the region of the protruding portion is prevented. The numbers and sizes of protruding portions of a transfer paper have previously been registered from the operation unit (not shown).

Figure 7:
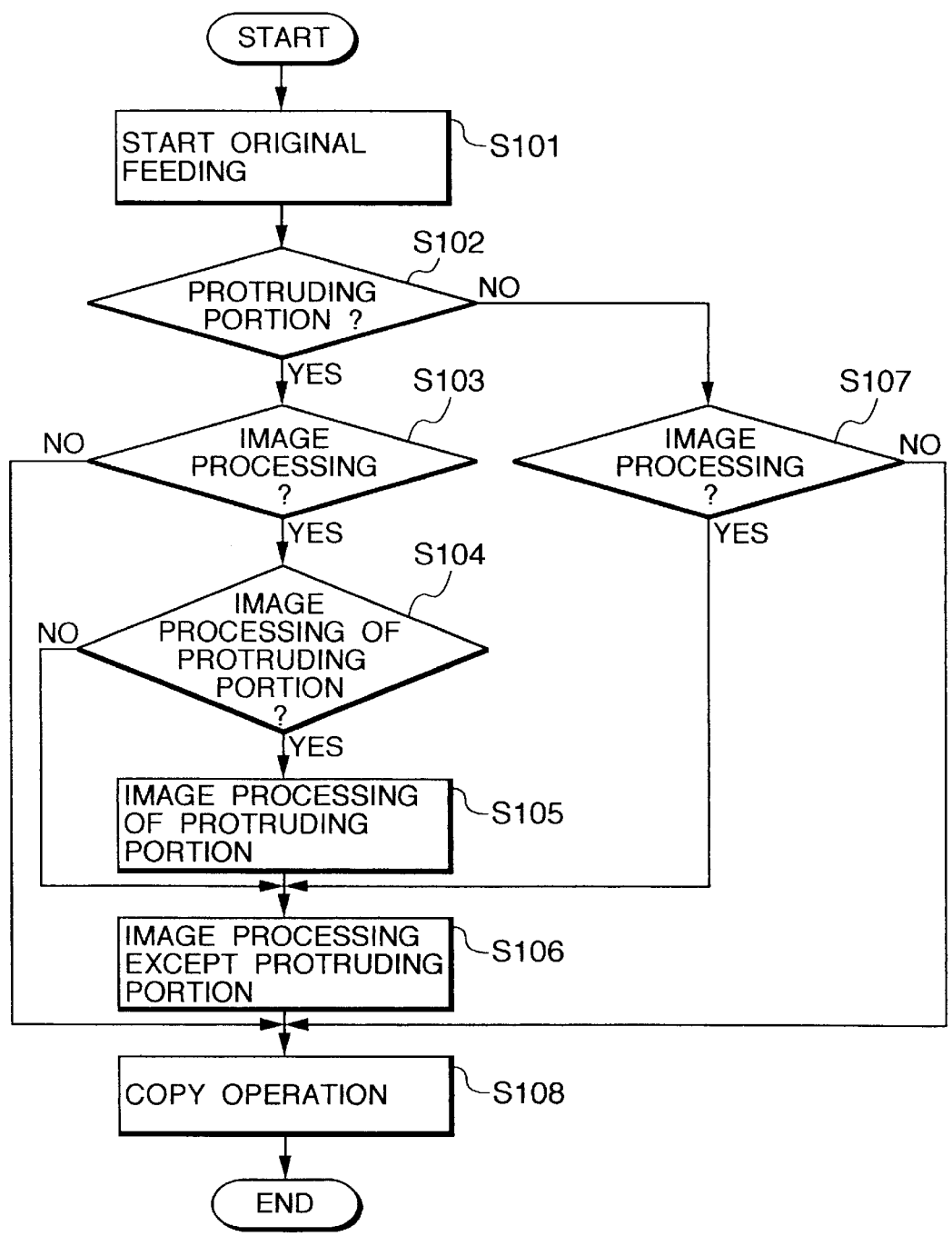
FIG. 7 is a flowchart for a copy operation.

The operations for performing the image process to the original having the protruding portion mentioned above and copying the image will now be described hereinbelow with reference to a flowchart shown in FIG. 7.

First, the original is fed by the document feeding apparatus 101 through the document feeding apparatus control unit 201 (step S101). Whether there is a protruding portion in the original or not is discriminated by the above protruding portion sensor (step S102). When the protruding portion is detected, a check is made to see if an image process such as a variable magnification or the like is executed to the original (step S103). If the control mode is not set so as to execute the image process, the copy operation (step S108) is directly performed.

In step S103, when the image process is executed, a check is made to see if the image process is further performed to the protruding portion of the original (step S104). When performing the image process to the protruding portion as shown in the second to fourth embodiments, which will be explained hereinlater in detail, the image process for the protruding portion is executed (step S105). On the other hand, when the image process is not performed to the protruding portion as in the example, the image process to the region other than the protruding portion is executed (step S106). The above copy operation (step S108) is performed.

When it is judged in step S102 that the original is an original of a fixed size without a protruding portion, a check is made to see if an image process such as a variable magnification process or the like is executed (step S107). In case of performing the image process, the image process is executed (step S106). The copy operation (step S108) is performed. When the image process is not performed in step S107, the processing routine directly advances to the copy operation (step S108).

Figure 8A:
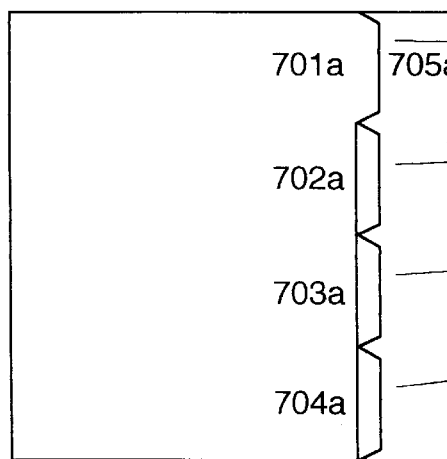
FIGS. 8A and 8B are diagrams showing an example of an image process.
Figure 8B:
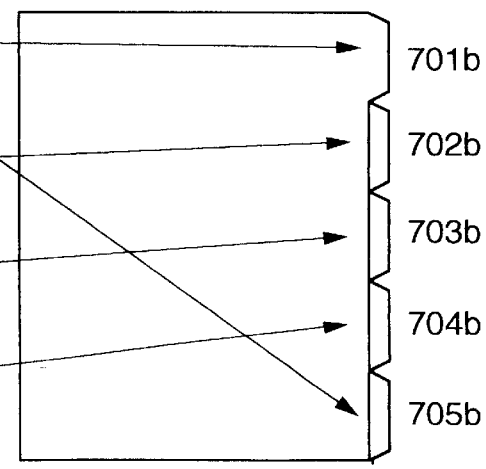

FIGS. 8A and 8B are diagrams showing an example of an image process which is executed in the image processing unit. In this example, the processes in the case where the numbers and sizes of the protruding portions of the original to be read and the recording sheet are different are shown. FIG. 8A shows the original having the protruding portions. FIG. 8B shows the recording sheet having the protruding portions. As shown in the diagrams, when the numbers, positions, and sizes of the protruding portions of the original and the recording sheets are different, the variable magnification shifting process is executed to the regions of the protruding portions corresponding to the same numbers (701a to 705a, 701b to 705b) for the image data in the regions of the protruding portions. Even in the case where the numbers of protruding portions are different, therefore, the image data in the regions of the protruding portions are formed onto the recording sheet having the protruding portions without losing the image data.

Figure 9A:
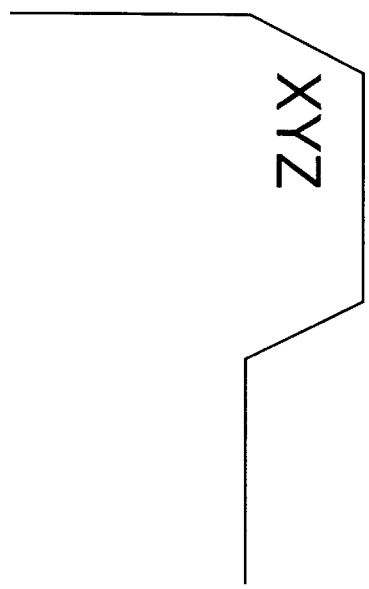
FIGS. 9A and 9B are diagrams showing an example of an image process.
Figure 9B:
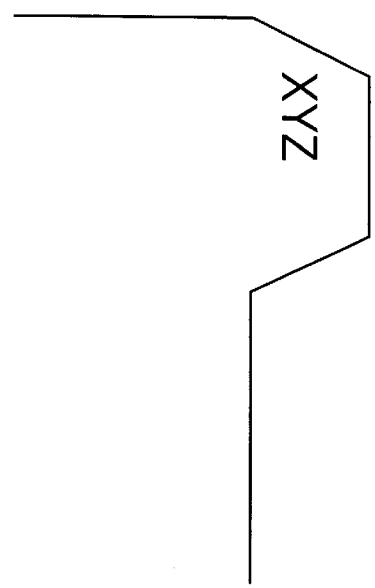

In this instance, since the sizes of protruding portions of the original having the protruding portions and the sizes of the protruding portions of the recording sheet having the protruding portions provided for the paper feeding apparatus are different (in this example, the size of protruding portion of the recording sheet is smaller than the size of protruding portion of the original), as shown in FIGS. 9A and 9B, a reducing process is executed on the basis of the sizes of the protruding portions of the original which were detected and the sizes of the protruding portions of the recording sheet which have been registered in the memory in a manner such that the image data in the region of the protruding portion of the original is properly enclosed into the region of the protruding portion of the recording sheet. That is, the variable magnification is made different every region and the process is performed.

Although the above example relates to the case where the number of protruding portions of the original is smaller than the number of protruding portions of the recording sheet, even in the case where the number of protruding portions of the recording sheet is contrarily larger than that of the original, the processes can be also similarly performed. In this instance, since the sizes of the protruding portions of the original are larger than the sizes of the protruding portions of the recording sheet, an enlarging process can also be performed to the image data in the region of the protruding portion.

Figure 10A:
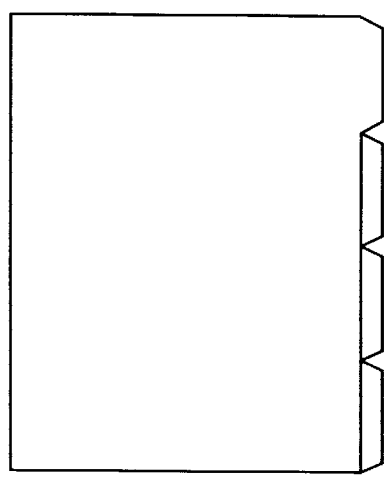
FIGS. 10A and 10B are diagrams showing an example of an image process.
Figure 10B:
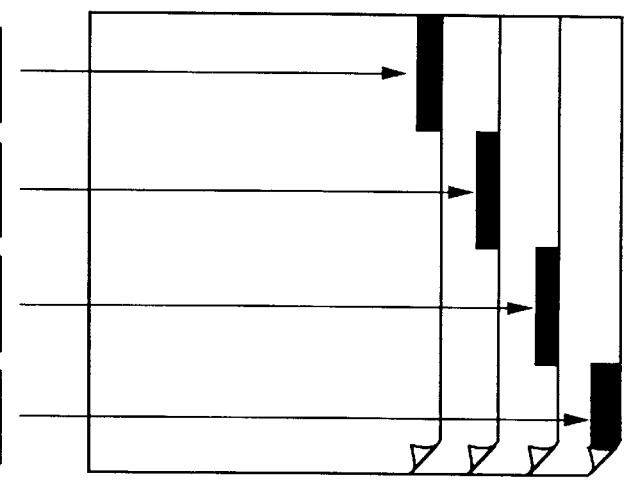
Figure 11A:
FIGS. 11A and 11B are diagrams showing an example of an image process.
Figure 11B:

FIGS. 10A and 10B are diagrams showing an example of an image process which is executed in the image processing unit. FIGS. 10A and 10B show the process in the case where the recording sheet having the protruding portions are not set into the paper feeding apparatus. As shown in the diagrams, image data in the regions of the protruding portions of the original having the protruding portions as shown in FIG. 10A is added to the recording sheet without a protruding portion as shown in FIG. 10B (FIG. 11B is an enlarged diagram of the protruding portions of the recording sheet). In this instance, in order to more easily understand information of the protruding portions, character data in the regions of the protruding portions can be also arranged on a rectangular pattern or these portions can also be colored in an apparatus which can output two or more colors.

Figure 12A:
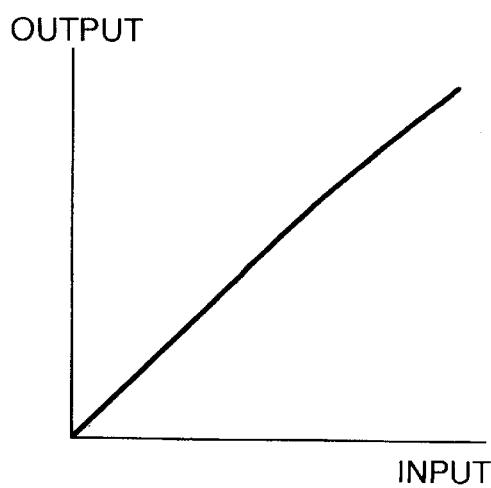
FIGS. 12A and 12B are diagrams showing parameters of an image process.
Figure 12B:
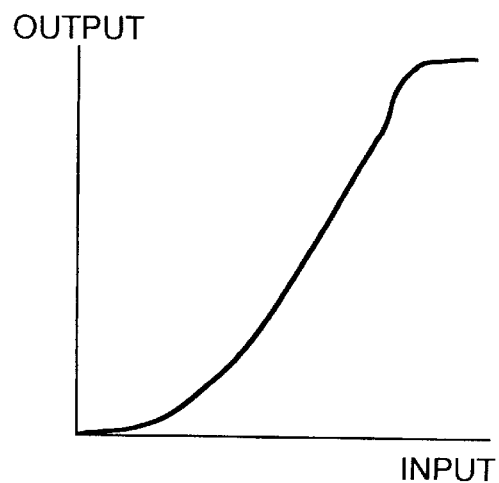

FIGS. 12A and 12B are diagrams showing an example of an image process (gradient correction) which is executed in the image processing unit. In the case where the input original having a protruding portion is constructed by image data having a feature such as a photograph or the like in a region other than the protruding portion and image data having a feature such as characters or the like in a region of the protruding portion, a gradient correction (correction of the relation of FIG. 12A) suitable for the image having the feature of the photograph or the like in the region other than the protruding portion is executed. A gradient correction (correction of the relation in FIG. 12B) suitable for the image having the feature of characters or the like in the region of the protruding portion is performed. That is, the gradient correction of input/output characteristics of a density is made different every region and the processes are executed.

A recording sheet cassette for enclosing recording sheets each having a protruding portion will now be described. The recording sheet cassette is the foregoing recording sheet cassettes 114 and 115 or the like. In order to set the sheets of the protruding portions at various positions, although not shown, it is sufficient to construct in a manner such that an additional several recording sheet cassettes other than the recording sheet cassettes 114 and 115 can be set.

Figure 13:
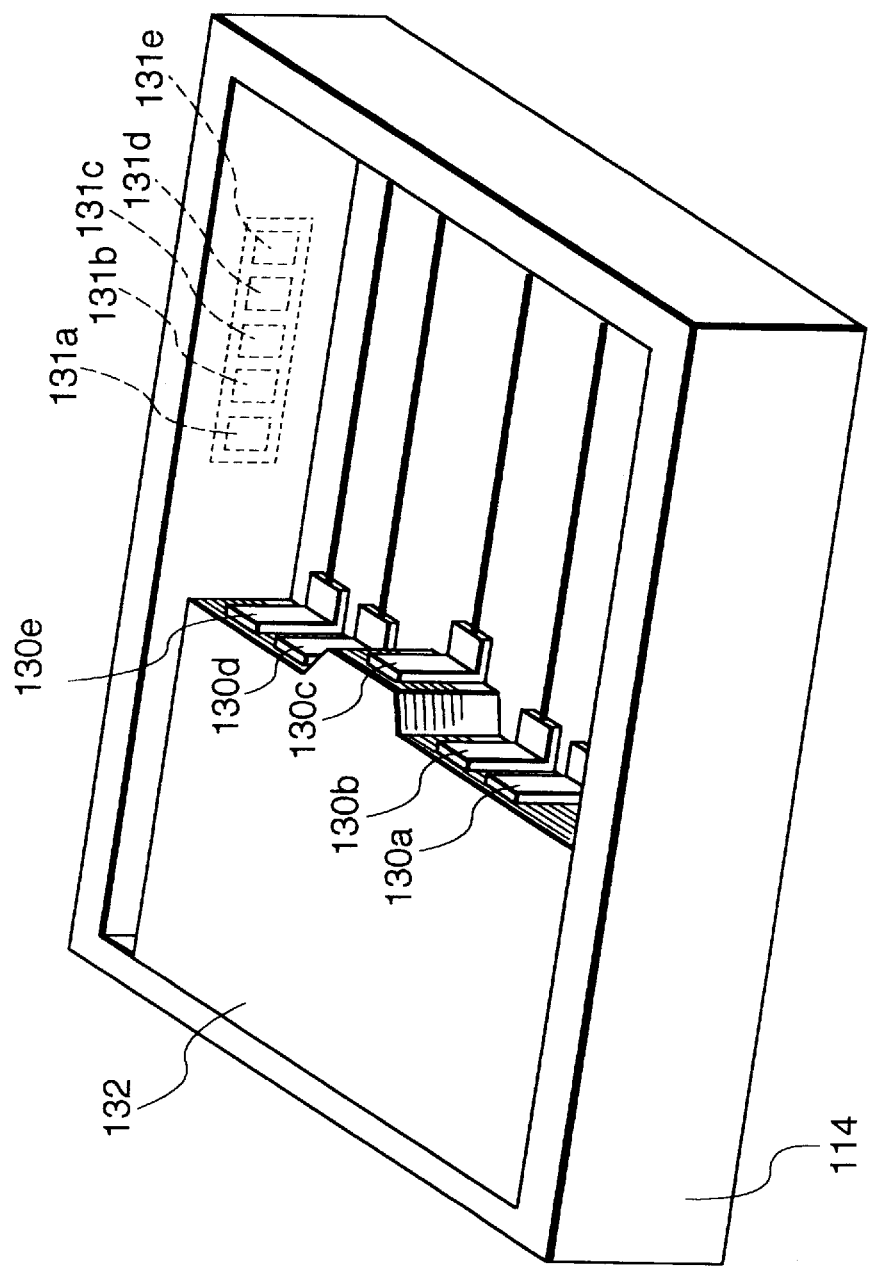
FIG. 13 is a diagram showing a sheet cassette.

In FIG. 13, reference numeral 114 denotes the recording sheet cassette for enclosing the recording sheets and feeding to the image recording unit. Reference numeral 132 denotes a recording sheet having a protruding portion enclosed in the recording sheet cassette 114 and shows a state in which the sheets of the same shape have been enclosed. Reference numerals 130a to 130e denote rear edge restricting members each for detecting a size and a position of the protruding portion. Although those rear edge restricting members are not shown, they can be slid and are provided with slide type resistors in the lower portion of the cassette. When the rear edge restricting member is moved, a resistance value of the slide type resistor changes.

Reference numerals 131a to 131e denote interface units attached to the side surface of the cassette 114. When the cassette 114 is set into the copying apparatus main body, signals corresponding to the resistance value from the rear edge restricting members 130a to 130e are outputted from the interface units 131a to 131e, respectively.

Although the case where there are five rear edge restricting members 130a–130e and five interface units 131a–131e has been described above, by providing more numbers of rear edge restricting members and interface units, the apparatus can cope with the sheets having various projections. In the above construction, the size and position of the protruding portion have been detected by the slide type resistor provided for the independent rear edge restricting member. However, such a detection can be realized by a method whereby the user inserts members into the interface units 131a to 13le and shutting them off.

The signals of the interface units 131a to 131e of the paper feed cassette are discriminated as position information of the transfer paper protruding portions by the CPU circuit unit 205. In the case where several kinds of recording sheets having the protruding portions exist and are respectively enclosed in different cassettes, the CPU 205 selects the recording sheet enclosing cassette to feed the papers as mentioned above on the basis of the positions of the protruding portions of the original and the signals from the interface units 131a to 131e. An operation unit provided for the copying apparatus will now be described.

Figure 14:
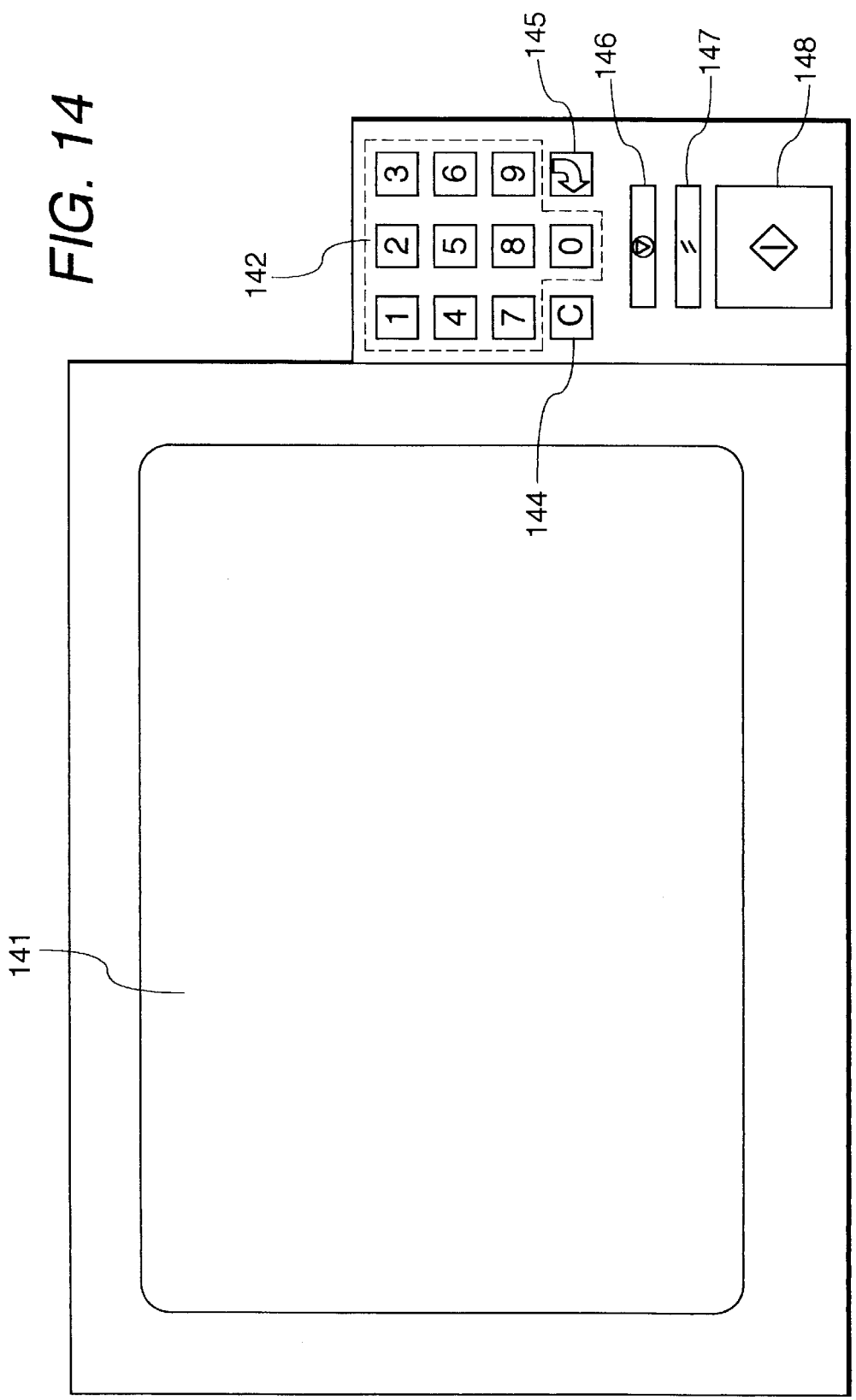
FIG. 14 is a diagram showing an operation unit.
Figure 15:
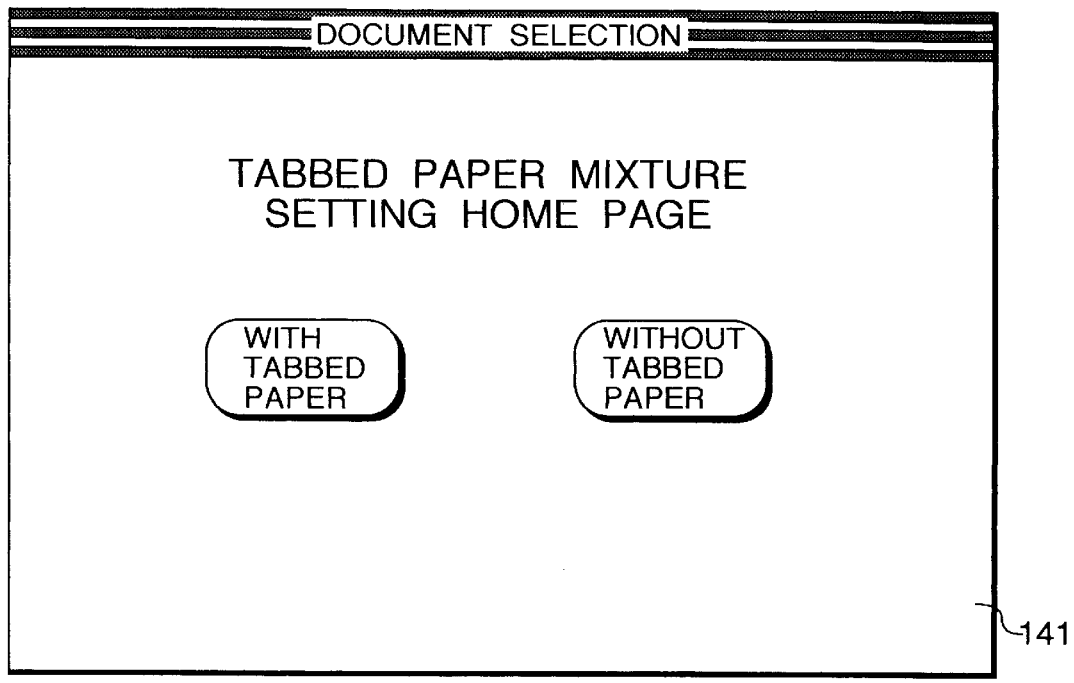
FIG. 15 is a diagram showing an operation picture plane.
Figure 16:
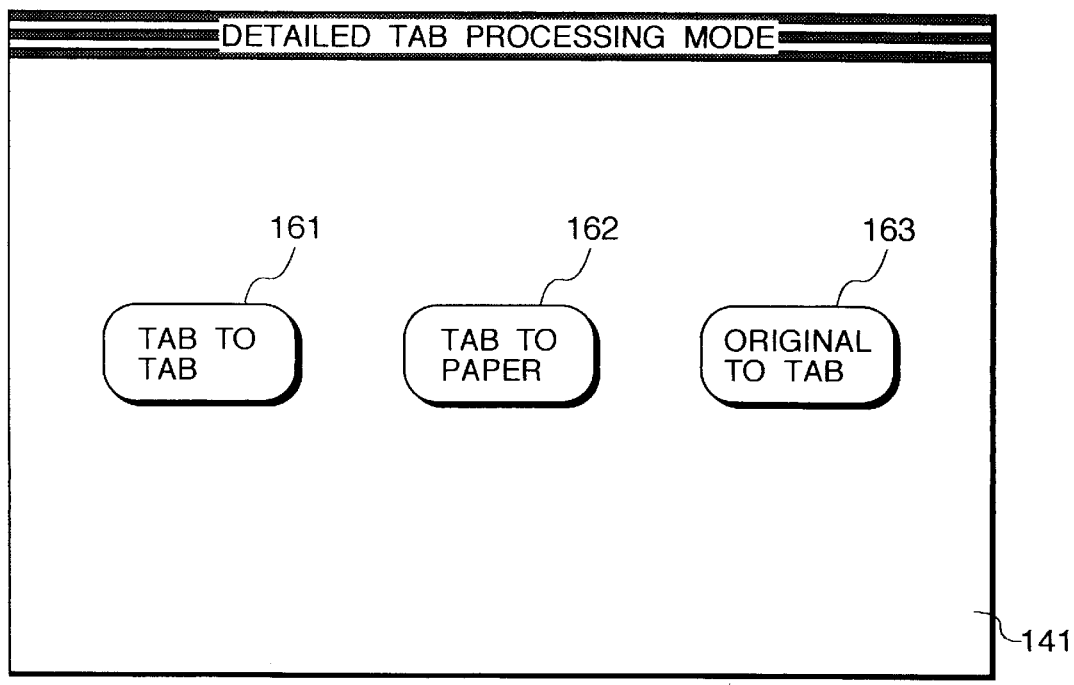
FIG. 16 is a diagram showing an operation picture plane.

FIG. 14 shows the operation unit. The operation unit is a touch panel display. Reference numeral 141 denotes a display; 142 a ten-key pad for setting the number of copies or the like; 144 is a clear key for clearing a numerical value set by the ten-key pad 142; 145 is an enter key; 146 is a stop key; 147 is a reset key; and 148 is a copy start key. FIG. 15 shows a picture plane which is displayed on the display 141 when the operator sets whether a tabbed paper [original having a protruding portion (tab)] is mixed in the originals to be set or not. When "with tabbed paper" is set, the document feeding apparatus 101 checks the presence or absence, positions, and sizes of the protruding portions of the originals one by one. FIG. 16 shows a picture plane for performing setting operations regarding the original having the protruding portion (tab) and the recording sheet having the protruding portion (tab). Reference numeral 161 denotes a key for setting a mode to automatically copy the original with the tab to the recording sheet with the tab when the original with the tab is detected; 162 a key for setting a mode to copy the original with the tab to the sheet of the fixed size without a tab; and 163 a key for setting a mode to copy the original of the fixed size without a tab to the recording sheet with the tab.

Figure 17:
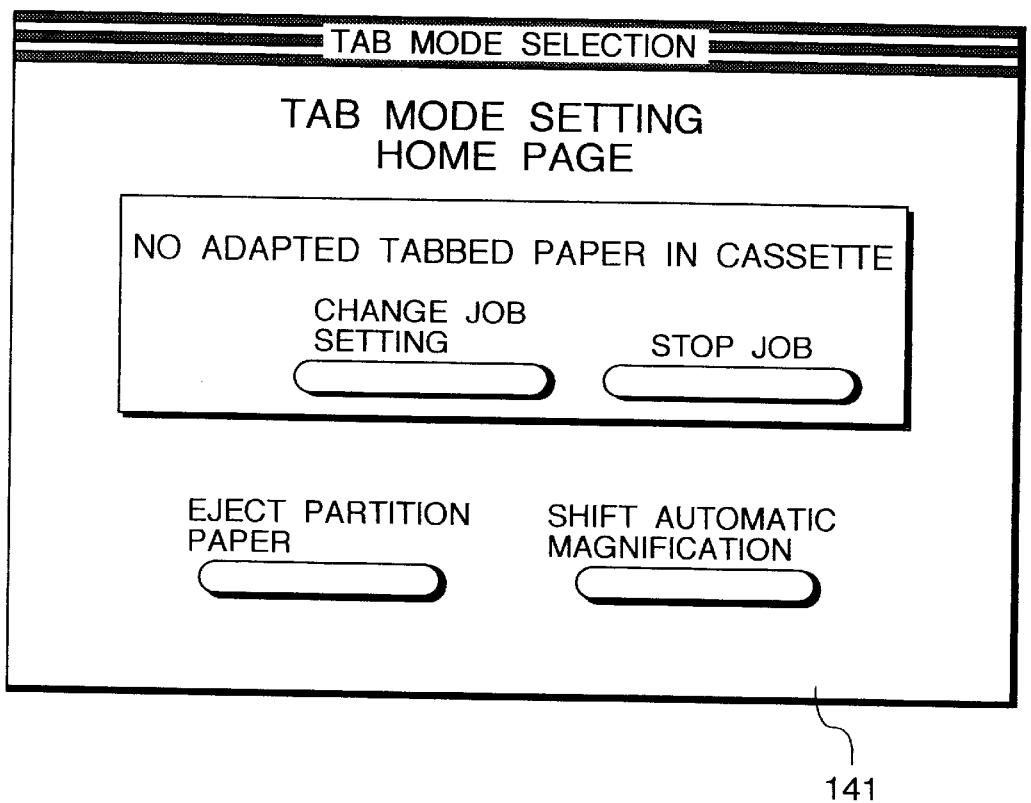
FIG. 17 is a diagram showing an operation picture plane.

FIG. 17 shows an alarm in the case where there is no tabbed paper in which the tab position of the original and the tab position of the recording sheet coincide. The operator selects any one of a mode for stopping a job, a mode for ejecting a partitioned paper, and a mode for automatically magnifying and automatically shifting an image on the tab of the original and for recording onto a tab of a tabbed sheet of a different tab position.

Figure 18:
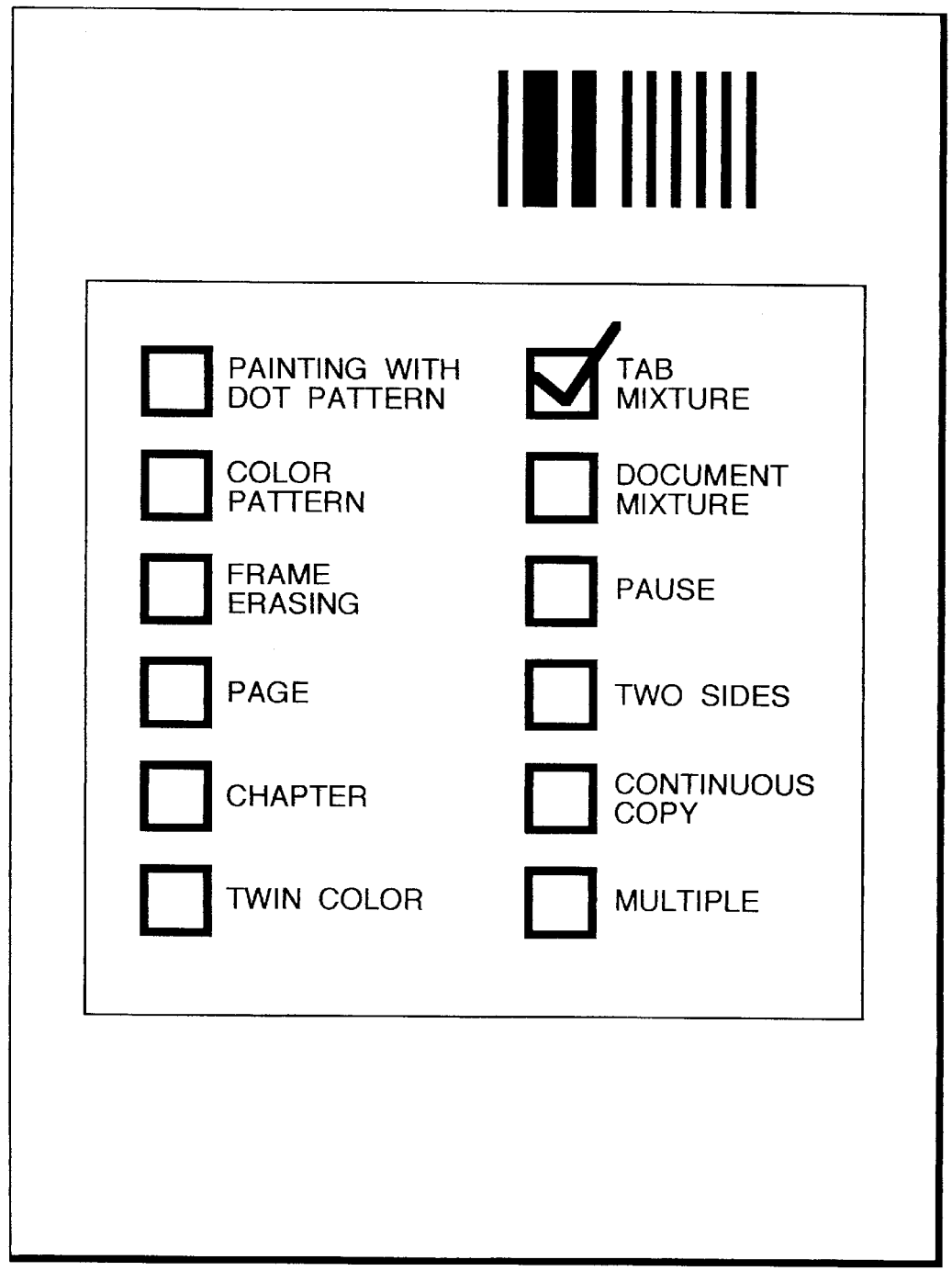
FIG. 18 is a mark sheet for setting a mode.

As shown in FIG. 18, it is also possible to insert a mark sheet to a position just before the tabbed paper in the originals and to set a tab mixture.

Figure 19:
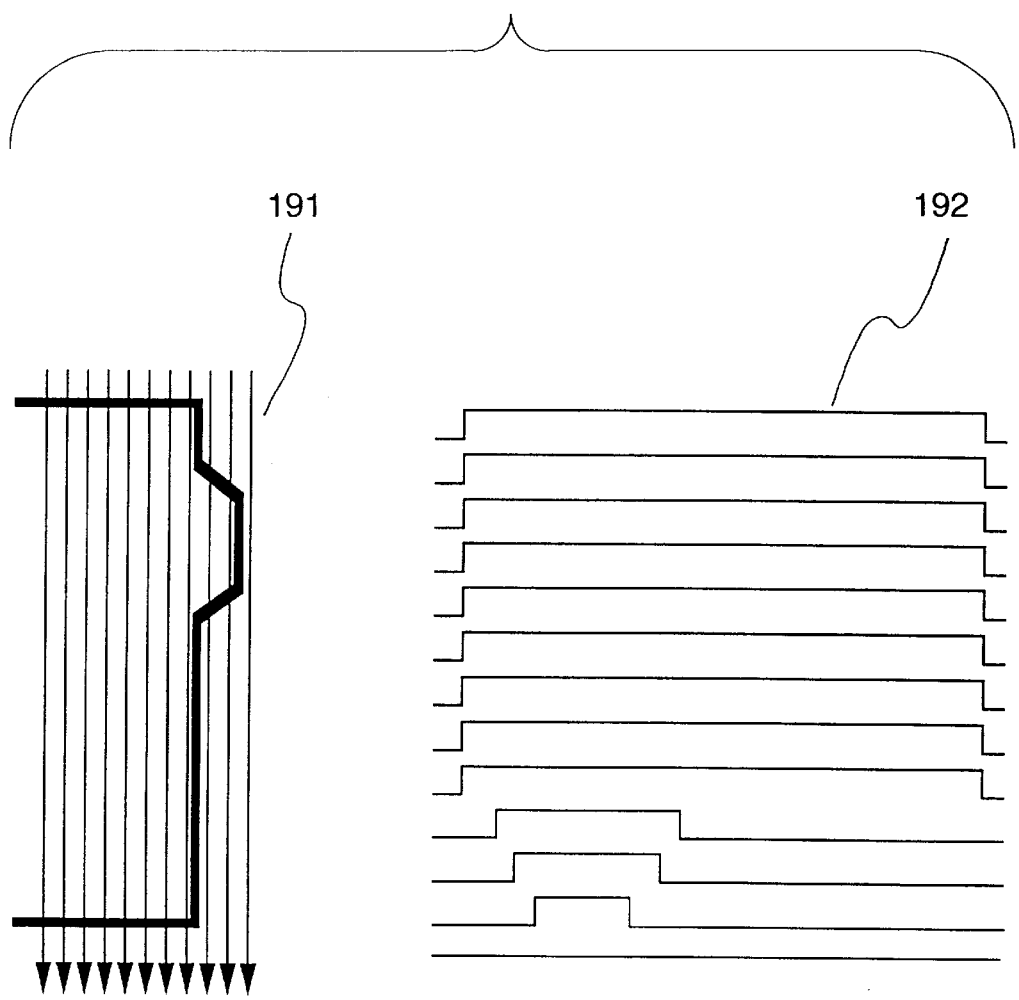
FIG. 19 is a diagram showing a method of detecting a protruding portion on the basis of an image.

Although the projection of the original has been detected by the sensor shown in FIG. 4 in the above embodiment, it can be also detected by the CCD 109. FIG. 19 is a diagram showing a state of an output signal when a tabbed paper is read by the CCD 109. In the diagram, a direction shown by an arrow 191 denotes the reading direction of the CCD 109 and the tabbed paper is sequentially raster scanned from the left side. The output signal of the CCD is a signal corresponding to a paper size as shown at reference numeral 192.

Figure 20:
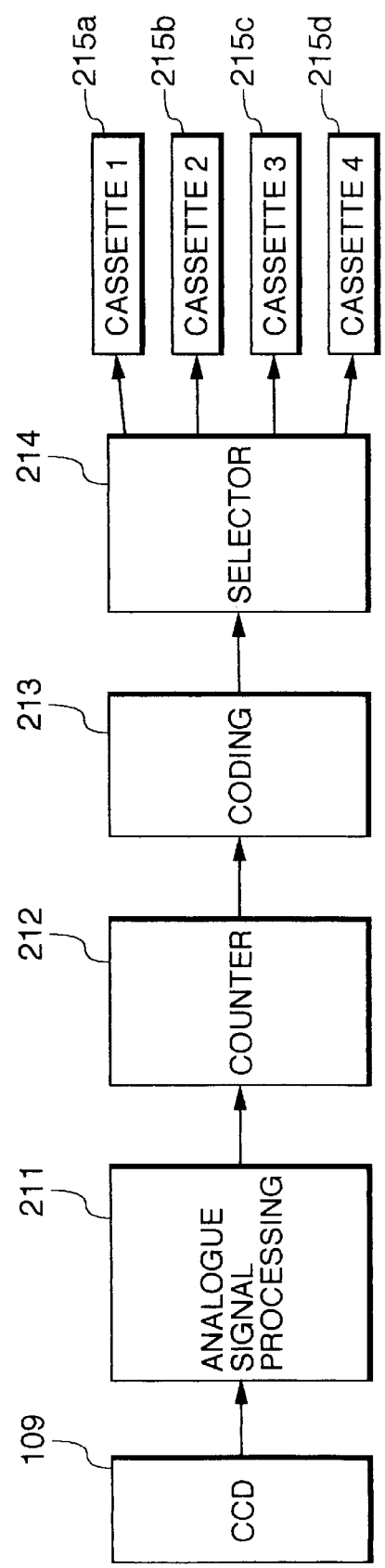
FIG. 20 is a diagram showing an example of a block diagram for executing a cassette selection according to the position of the protruding portion.

FIG. 20 is a block diagram for detecting the projection by the CCD and selecting the cassette. When the signal from the CCD 109 is generated as shown at 192 in FIG. 19, an interval of the signal is counted by a counter 212 through an analogue signal processing 211. A count value of the counter indicates a length in the main scanning direction of the original. A length in the subscanning direction of the original is detected by counting the same lengths in the main scanning direction by a distance corresponding to how many number of scanning lines. By detecting the portions in which the lengths of the signals in the main scanning direction are different, the protruding portions are detected. When the signal in the main scanning direction is not generated, it is judged that such a portion is out of the original area.

A coding circuit 213 performs a coding process on the basis of the output signal from the counter 212. A selector 214 selects any one of cassettes 215a to 215d on the basis of the code. The sheets with protruding portions having the same tab position and tab size are enclosed in each cassette. It is assumed that the tab position and size differ in every cassette.

Figure 21:
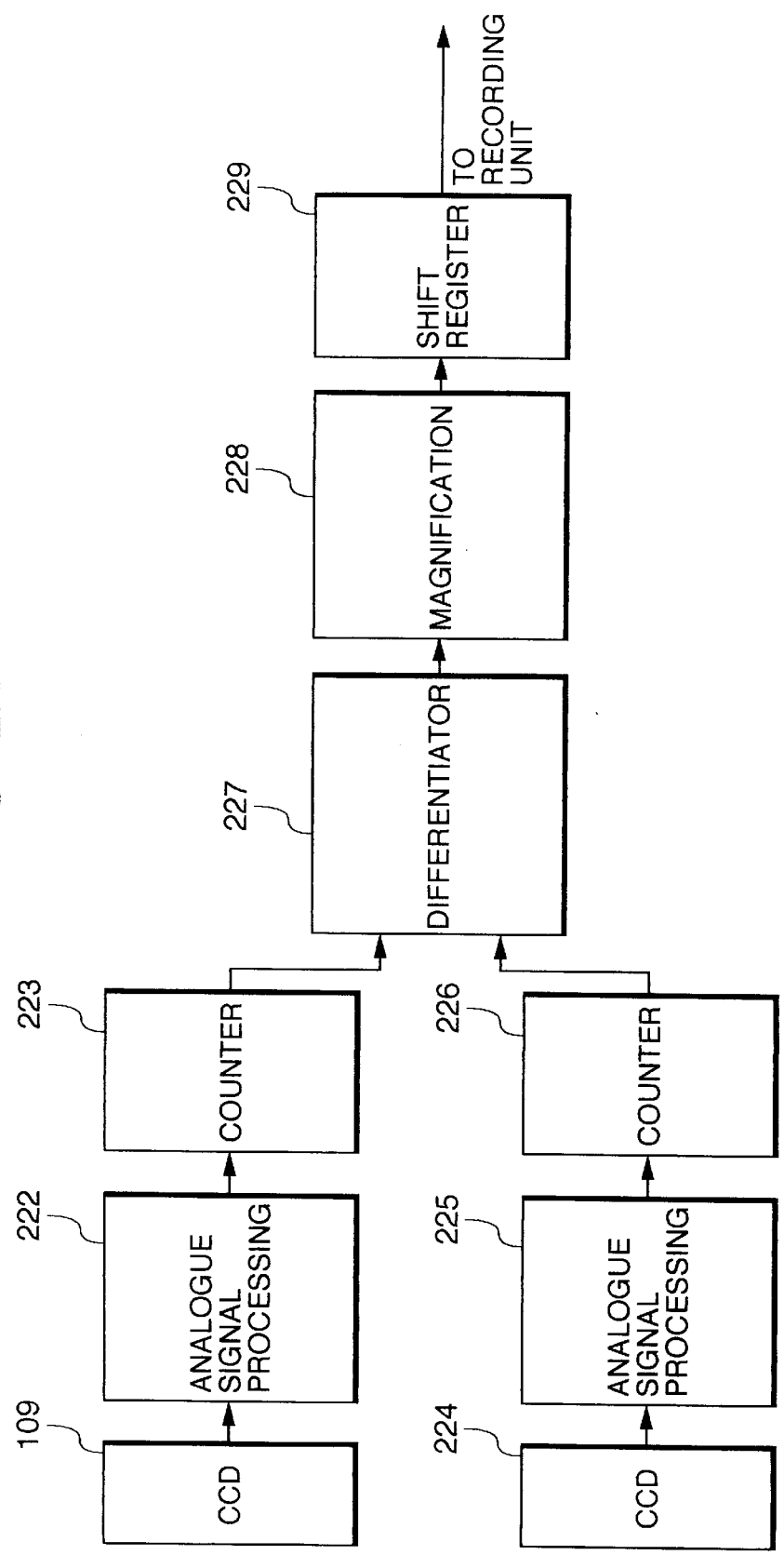
FIG. 21 is a diagram showing an example of a block diagram for shifting an image of a projection of an original to a protruding portion of a recording sheet.

FIG. 21 is a constructional diagram in case of shifting and zooming an image on the original tab and recording onto the recording sheet tab without using a method of selecting the cassette.

Reference numerals 222 and 223 denote a signal processing unit for processing the signal from the CCD 109 and a counter which are similar to those mentioned above. Reference numerals 224, 225, and 226 denote a CCD, an analogue signal processing unit, and a counter which are provided to detect a tab of the recording sheet.

In the above construction, the recording sheet is raster scanned in the main scanning direction by using the CCD in a manner similar to the image reading unit, thereby detecting the tab portion.

The tab position and size information of the original are outputted from the counter 223. The tab position and size information of the recording sheet are outputted from the counter 226. Reference numeral 227 denotes a differentiator for comparing the count values of the counters 223 and 226, thereby obtaining a difference between them. When the sizes are different, a variable magnification process is executed by a magnification circuit 228. When the tab positions are different, a process to shift the image in the tab portion is executed by a shift register 229. The shift register can be also embodied by an FIFO memory. An output signal from the shift register 229 can also be transferred to the recording unit by previously shifting the image. Or, a shift amount is transferred to the recording unit and the writing position for the recording sheet can be also shifted in the recording unit.

A mode of "TAB TO PAPER" shown in FIG. 16 will now be described.

Figure 22:
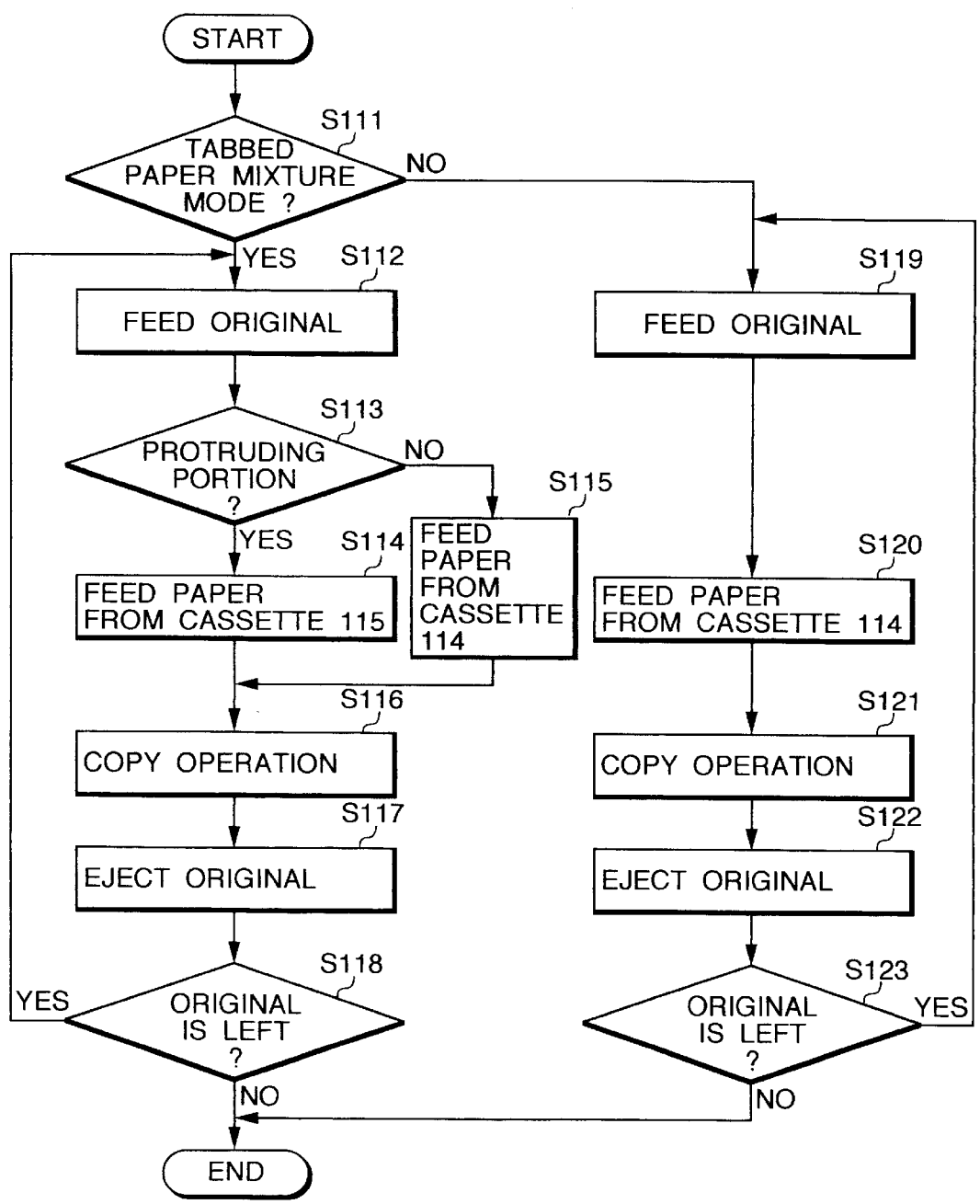
FIG. 22 is a control flowchart according to the presence or absence of the protruding portion of the original.
Figure 23:
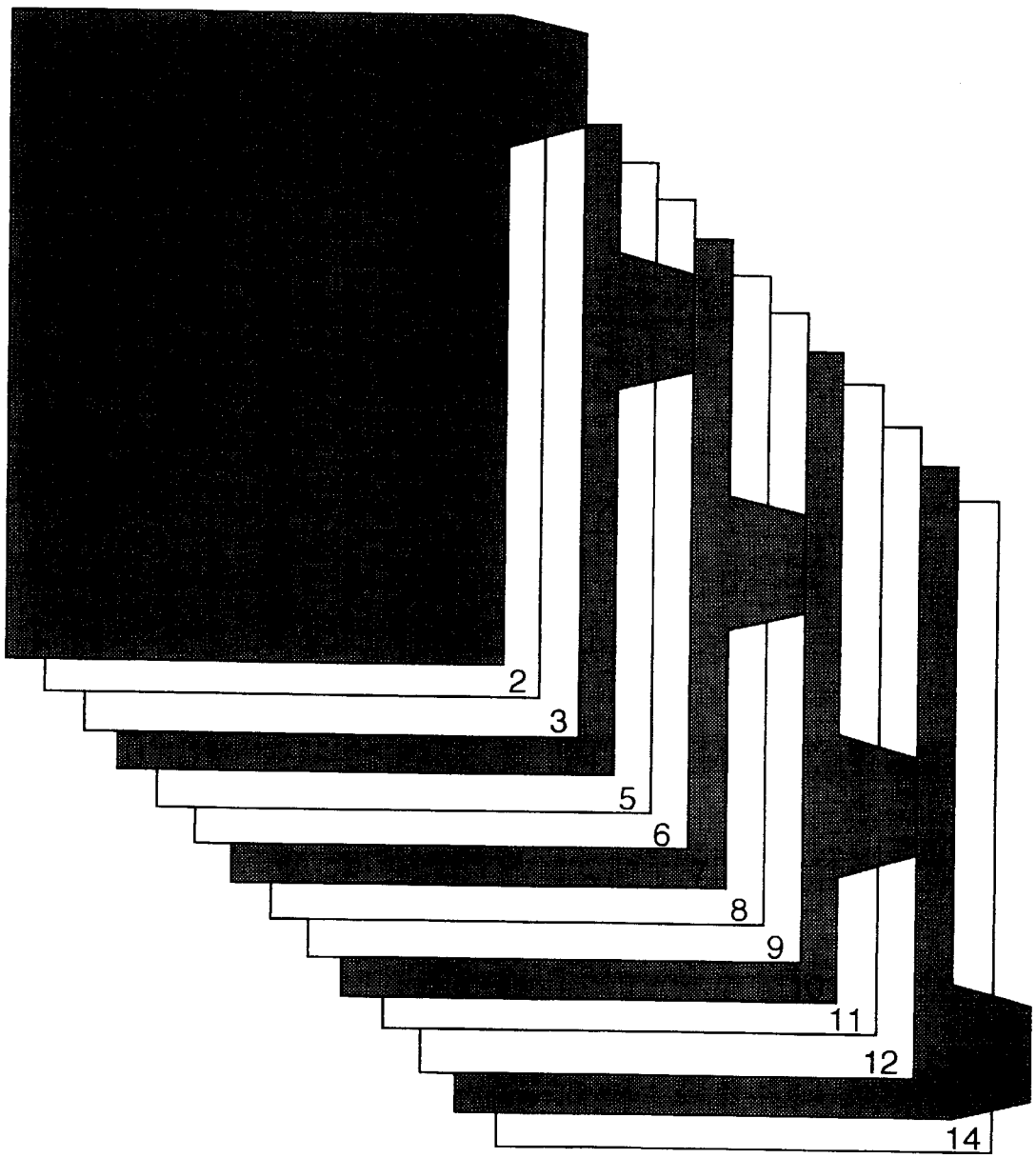
FIG. 23 is a diagram showing a state of an original before processes for the control of FIG. 22.
Figure 24:
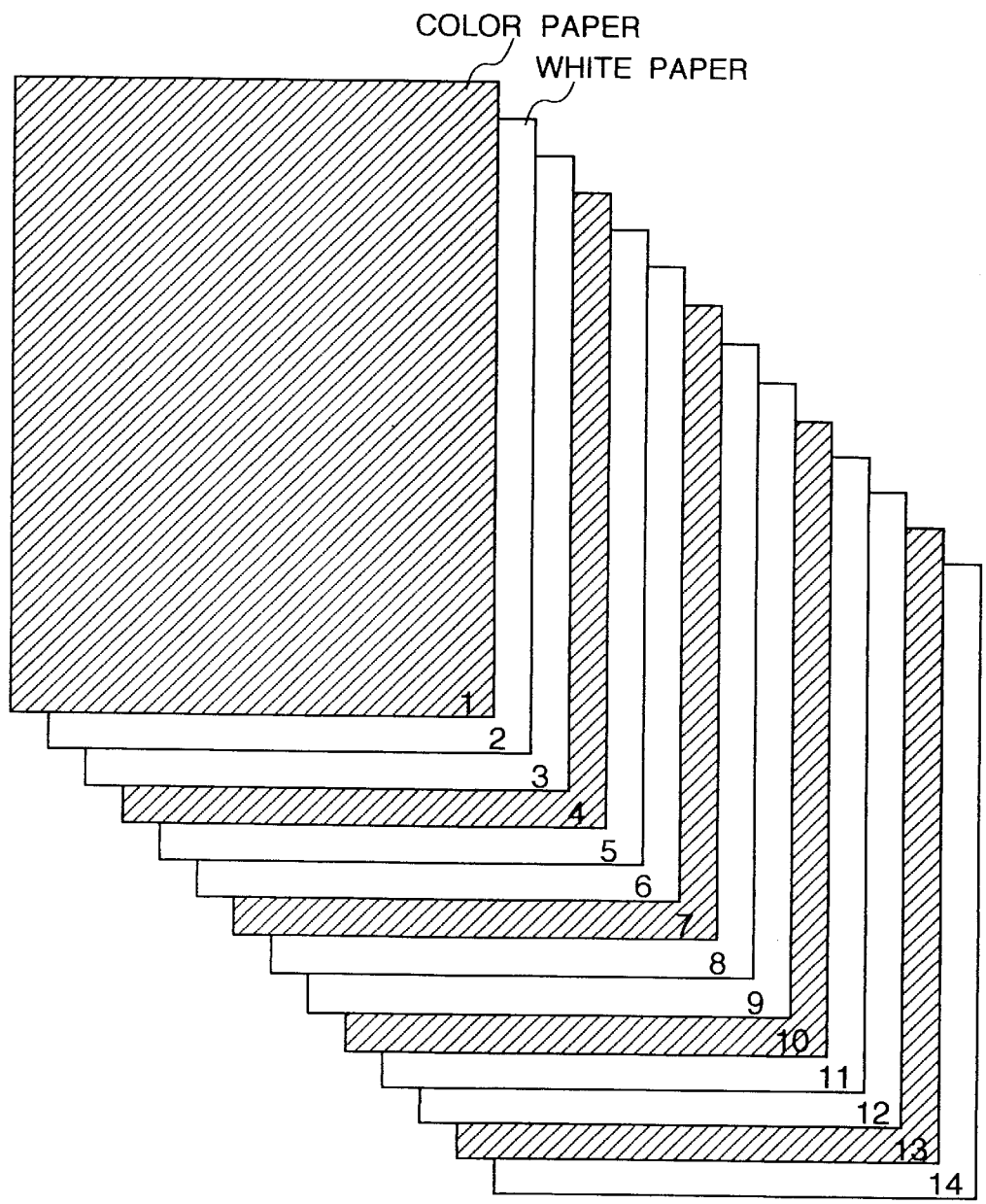
FIG. 24 is a diagram showing a state of the recording sheet after completion of the processes for the control of FIG. 22.

FIG. 22 is a control flowchart for the above mode. In case of making the apparatus operative in this mode, the operator previously encloses white recording sheets which are generally used into the cassette 114 and also encloses color papers into the cassette 115. First, a check is made to see if a tabbed paper mixture original has been set in the picture plane shown in FIG. 15 (step S111). In the tabbed paper mixture mode, the original is fed (step S112) and a check is made to see if there is a protruding portion (step S113). When there is a protruding portion, the color paper is fed from the cassette 115 (step S114). If there is no protruding portion, the white recording sheet is fed from the cassette 114 (step S115). The copy operation is performed (step S116) and the original is ejected (step S117). In this instance, a check is made to see if there is a remaining original (step S118). If there is a remaining original, step S112 follows. If there is no remaining original, the processing routine is finished. When the operation mode is not the tabbed paper mixture mode in step S111, the processes in steps S119 to S123 are executed. By these processes, the color paper is inserted to the copy page corresponding to the original (FIG. 23) having the protruding portion among the originals (FIG. 24). An inherent role of the page having the protruding portion is realized by the color paper.

Figure 25:
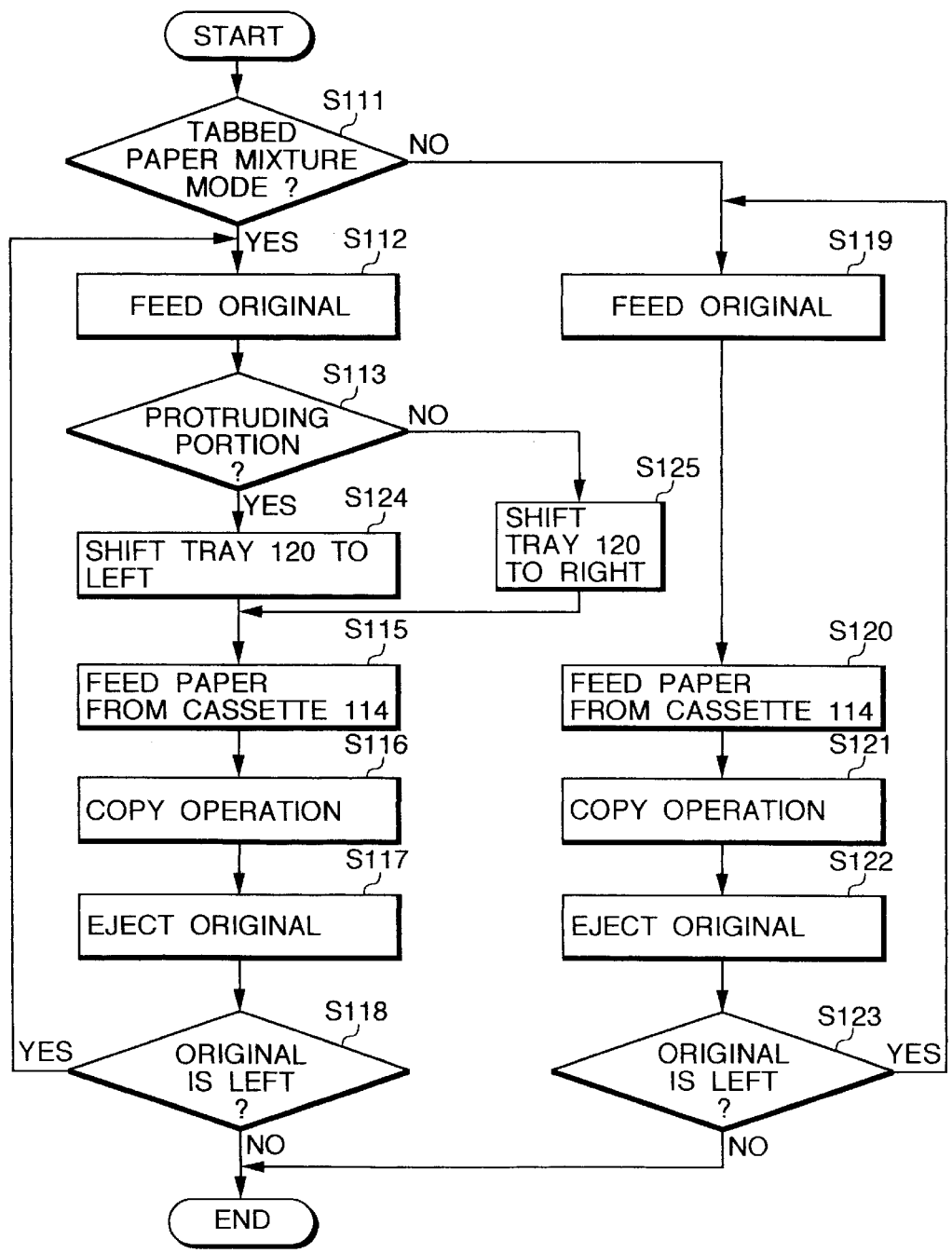
FIG. 25 is a control flowchart according to the presence or absence of the protruding portion of the original.
Figure 26:
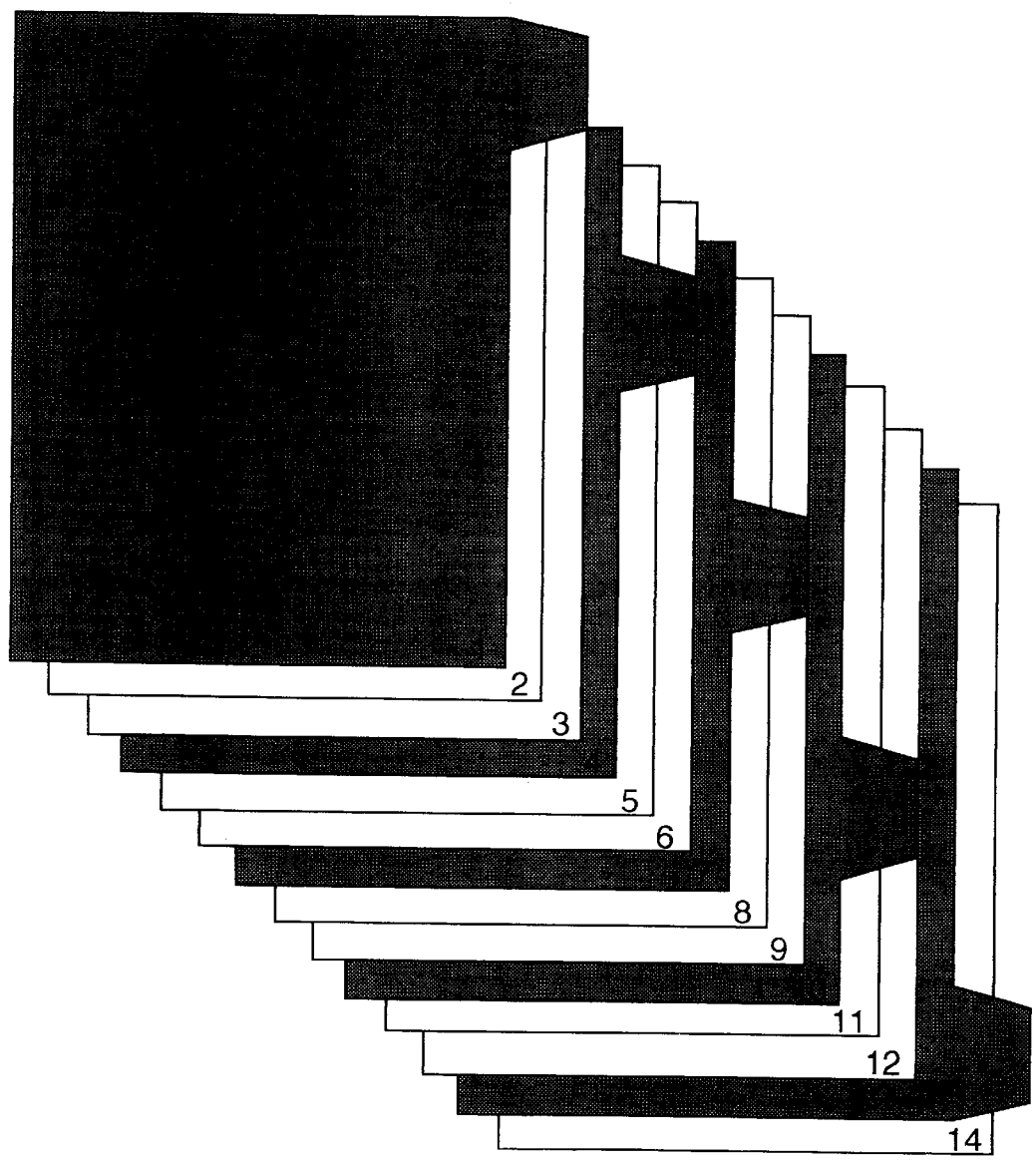
FIG. 26 is a diagram showing a state of an original before processes for the control of FIG. 25.
Figure 27:
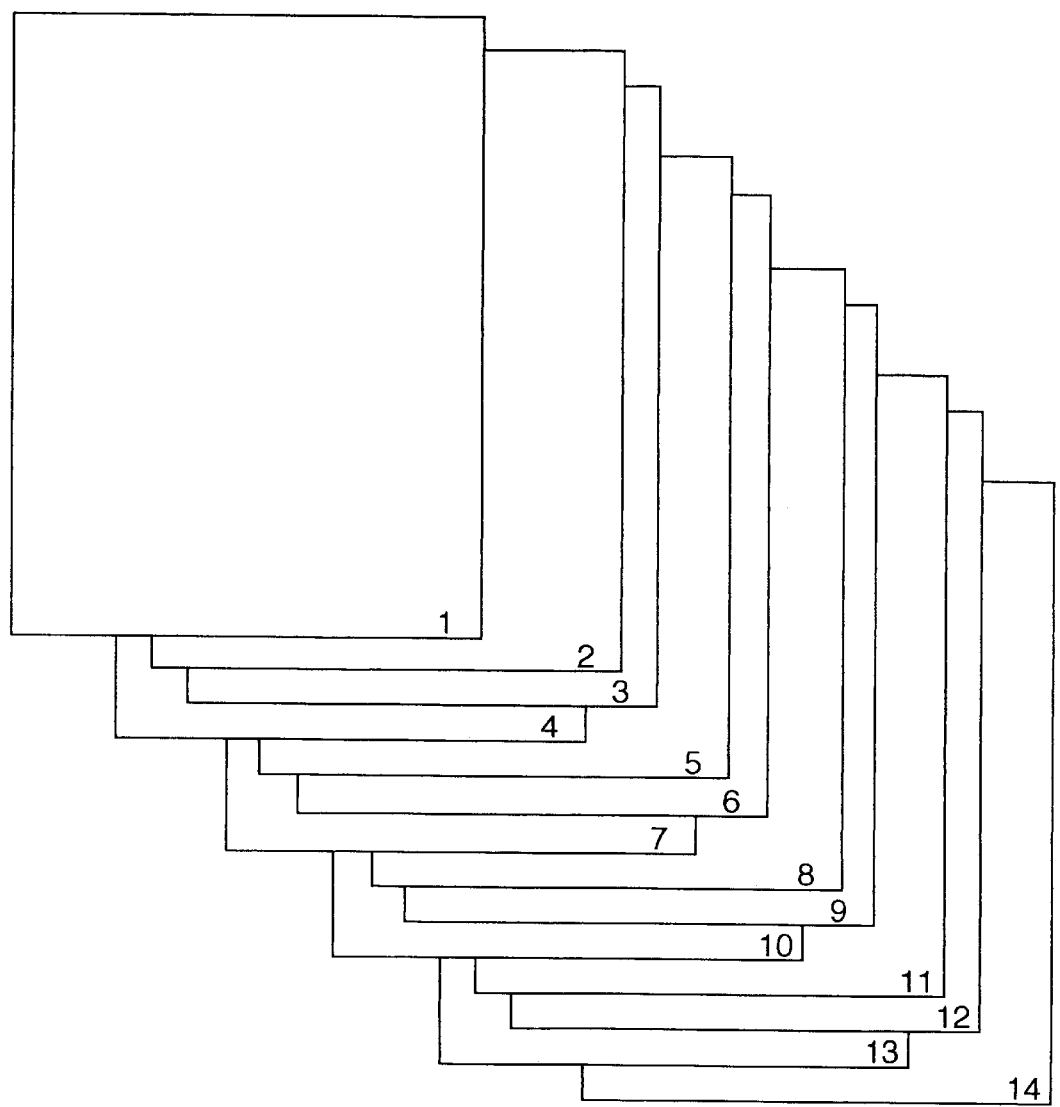
FIG. 27 is a diagram showing a state of the recording sheet after completion of the processes for the control of FIG. 25.

Another embodiment will now be described. In the above embodiment, the kind of sheet to be fed has been changed in steps S114 and S115. However, it is also possible to construct in a manner such that the tray 120 is shifted to the left or right for the sheet ejecting direction and that, as shown in FIG. 25, when there are protruding portions, the tray 120 is shifted to the left (step S124) and, when there is no protruding portion, the tray 120 is shifted to the right (step S125). According to such processes, the copy sheets of the originals in FIG. 26 are ejected as shown in FIG. 27.

Figure 28:
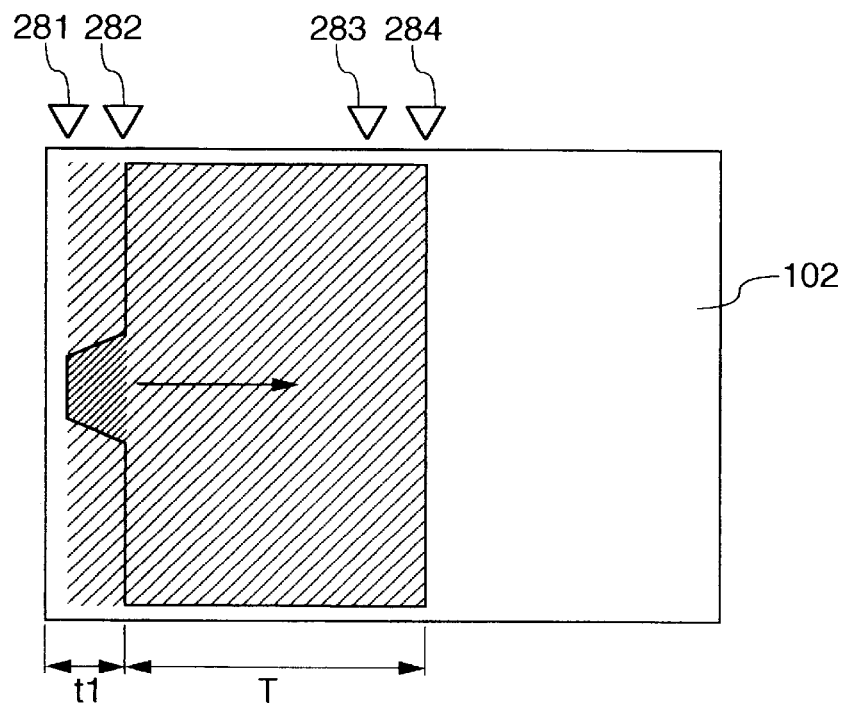
FIG. 28 is a diagram showing a stop position of an original.
Figure 29:
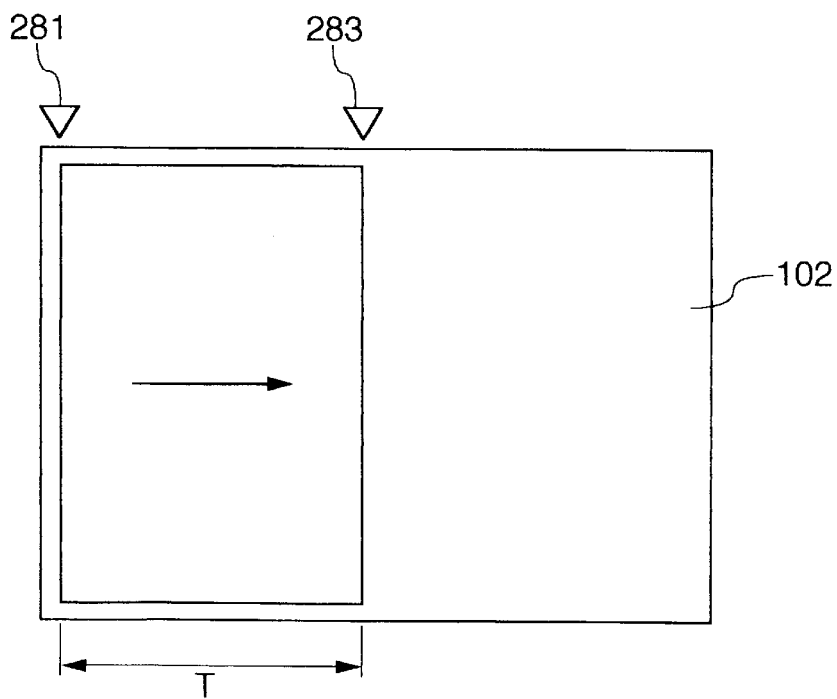
FIG. 29 is a diagram showing a stop position of an original.
Figure 30:
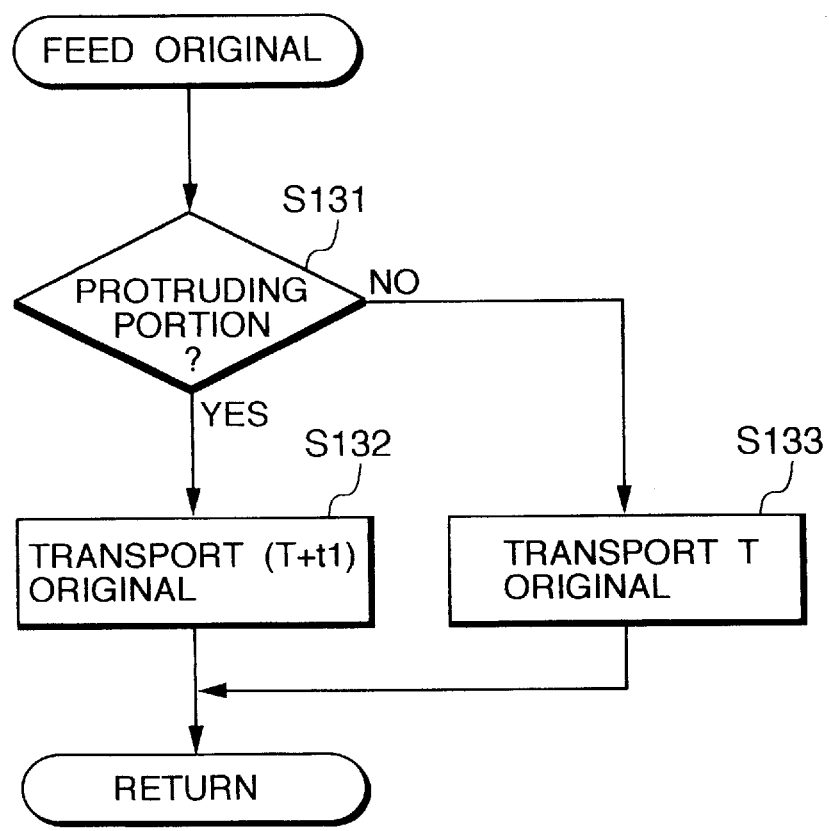
FIG. 30 is a control flowchart for feeding an original.

The conveyance of originals will now be described with reference to a flowchart of FIG. 30. When the presence of the protruding portion is judged (step S131), the conveyance is stopped (step S132) after the elapse of (T+t1) seconds after the front edge of the original had reached the position of the original supporting glass surface 102 and the apparatus is set into a state of FIG. 28. When the absence of the protruding portion is discriminated, the conveyance is stopped after the elapse of T seconds (step S133) and the apparatus is set into a state of FIG. 29. When there is a protruding portion, a region between 281 to 282 is processed as an image of the protruding portion and a region between 282 to 284 is processed as an original image. When there is no protruding portion, a region between 281 to 283 is processed as an original image.

What is claimed is:

1. A copying apparatus comprising:
   first stacking means for stacking recording sheets each having a protruding portion;
   second stacking means for stacking recording sheets each having no protruding portion;
   detecting means for detecting a protruding portion of an original to be copied; and
   copying means for copying an image of said original to the recording sheet fed from said first stacking means in the case where the protruding portion of the original is detected by said detecting means and for copying the image of said original onto the recording sheet fed from said second stacking means in the case where the protruding portion of the original is not detected by said detecting means.

2. An apparatus according to claim 1, wherein said copying means includes reading means for reading the image of the original and image forming means for forming the image read by said reading means onto the recording sheet.

3. An apparatus according to claim 2, wherein said detecting means detects the protruding portion of the original on the basis of the image read by said reading means.

4. An apparatus according to claim 1, wherein said copying means copies the image of the protruding portion of the original to the protruding portion of the recording sheet.

5. A copying apparatus comprising:
   first stacking means for stacking recording sheets each having a protruding portion;
   second stacking means for stacking recording sheets each having no protruding portion;
   detecting means for detecting a protruding portion of an original to be copied;
   copying means for copying an image of the original to the recording sheet fed from said first stacking means in the case where a protruding portion of the original is detected by said detecting means and for copying an image of said original onto the recording sheet fed from said second stacking means if the protruding portion of the original is not detected by said detecting means; and
   original feeding means for feeding the original to said copying means by using the protruding portion of the original as a rear edge,
   wherein said detecting means includes a plurality of sheet detection sensors which are provided in the middle of a feeding path of said original feeding means and are arranged in the direction perpendicular to the feeding direction.

6. An apparatus according to claim 5, wherein a trailing edge of the original fed by said original feeding means has a protruding portion.

7. An apparatus according to claim 5, wherein said copying means copies the image of the protruding portion of the original to the protruding portion of the recording sheet.

8. A copying apparatus comprising:
   first stacking means for stacking recording sheets each having a protruding portion;
   second stacking means for stacking recording sheets each having no protruding portion;
   detecting means for detecting a protruding portion of an original to be copied;
   copying means for copying an image of said original to the recording sheet fed from said first stacking means in the case where the protruding portion of the original is detected by said detecting means and for copying the image of said original onto the recording sheet fed from said second stacking means in the case where the protruding portion of the original is not detected by said detecting means; and
   original feeding means for feeding the original to said copying means,
   wherein when a protruding portion of the original is detected by said detecting means, said original feeding means feeds said original longer than a feeding distance of an original having no protruding portion and, thereafter, stops the original.

9. An apparatus according to claim 8, wherein a trailing edge of the original fed by said original feeding means has a protruding portion.

10. An apparatus according to claim 8, wherein said copying means copies the image of the protruding portion of the original to the protruding potion of the recording sheet.

11. A copying apparatus comprising:

first stacking means for stacking recording sheets each having a protruding portion;

second stacking means for stacking recording sheets each having no protruding portion;

detecting means for detecting a protruding portion of an original to be copied; and copying means for copying an image of said original to the recording sheet fed from said first stacking means in the case where the protruding portion of the original is detected by said detecting means and for copying the image of said original onto the recording sheet fed from said second stacking means in the case where the protruding portion of the original is not detected by said detecting means, wherein in the case where a position of a protruding portion of the original and a position of the protruding portion of the recording sheet are different, said copying means shifts the image of the protruding portion of said original and copies to the protruding portion of the recording sheet.

12. An apparatus according to claim 11, wherein said first stacking means has a plurality of guides arranged in the direction perpendicular to the sheet feeding direction on the rear edge side for the sheet feeding direction, said copying apparatus has second detecting means for detecting positions of said guides, and said copying means shifts the image of the protruding portion of the original on the basis of detection results of said detecting means and said second detecting means.

13. An apparatus according to claim 11, wherein said detecting means detects the protruding portion of the original on the basis of the image read by a reading means.

14. A copying apparatus comprising:

first stacking means for stacking recording sheets each having a protruding portion;

second stacking means for stacking recording sheets each having no protruding portion;

detecting means for detecting a protruding portion of an original to be copied; and copying means for copying an image of said original to the recording sheet fed from said first stacking means in the case where the protruding portion of the original is detected by said detecting means and for copying the image of said original onto the recording sheet fed from said second stacking means in the case where the protruding portion of the original is not detected by said detecting means, wherein in the case where a size of a protruding portion of the original and a size of the protruding portion of the recording sheet are different, said copying means variably magnifies the image of the protruding portion of the original and copies to the protruding portion of the recording sheet.

15. An apparatus according to claim 14, wherein said detecting means detects the protruding portion of the original on the basis of the image read by a reading means.

16. A copying apparatus comprising:

first stacking means for stacking color recording sheets;

second stacking means for stacking white recording sheets;

detecting means for detecting a protruding portion of an original to be copied; and copying means for copying an image of said original onto the recording sheet fed from said first stacking means in the case where a protruding portion of the original is detected by said detecting means and for copying the image of said original onto the recording sheet fed from said second stacking means in the case where the protruding portion of the original is not detected by said detecting means.

17. A copying apparatus comprising:

stacking means for stacking recording sheets having no protruding portion;

detecting means for detecting a protruding portion of an original to be copied; and copying means for copying an image of the protruding portion of the original which was detected by said detecting means and an image other than said protruding portion onto the recording sheet fed from said stacking means.

18. An apparatus according to claim 11, wherein said copying means shifts the image of the protruding portion of the original into the recording sheet and copies.

19. An apparatus according to claim 17, wherein said detecting means detects the protruding portion of the original on the basis of the image read by a reading means.

20. A copying apparatus comprising;

first stacking means for stacking sheets each having a protruding portion;

second stacking means for stacking sheets each having a protruding portion at a position different from a position of the protruding portion of the sheets stacked in said first stacking means;

detecting means for detecting a position of a protruding portion of an original;

copying means for copying an image of an original to the sheet; and sheet feeding means for feeding the sheet from either of said first stacking means and said second stacking means to said copying means in accordance with a detection result of said detecting means.

21. An apparatus according to claim 20, further comprising original feeding means for feeding the original to said copying means, wherein said detecting means includes a plurality of sheet detection sensors, which are provided in the middle of a feeding path of said original feeding means and are arranged in the direction perpendicular to a feeding direction.

22. An apparatus according to claim 21, wherein a trailing edge of the original fed by said original feeding means has a protruding portion.

23. An apparatus according to claim 20, wherein said copying means copies the image of the protruding portion of the original to the protruding portion of the recording sheet.

24. An apparatus according to claim 20, wherein said detecting means detects the protruding portion of the original on the basis of the image read by a reading means.

25. A copying apparatus comprising:

first stacking means for stacking sheets each having a protruding portion;

second stacking means for stacking recording sheets each having no protruding portion;

detecting means for detecting a protruding portion of an original;

copying means for copying an image of an original to the sheet;

sheet feeding means for feeding the sheet from said first stacking means if the protruding portion of the original is detected by said detecting means and for feeding the sheet from said second stacking means to said copying means if the protruding portion of the original is not detected by said detecting means; and original feeding means for feeding the original to said copying means, wherein said detecting means includes a plurality of sheet detection sensors, which are provided in the middle of a feeding path of said original feeding means and are arranged in the direction perpendicular to a feeding direction.

26. An apparatus according to claim 25, wherein a trailing edge of the original fed by said original feeding means has a protruding portion.

27. An apparatus according to claim 25, wherein said copying means copies the image of the protruding portion of the original to the protruding portion of the recording sheet.

* * * * *

UNITED STATES PATENT AND TRADEMARK OFFICE
CERTIFICATE OF CORRECTION

PATENT NO. : 5,848,320
DATED : December 8, 1998
INVENTOR(S) : MASATOSHI YAGINUMA, ET AL.

It is certified that error appears in the above-identified patent and that said Letters Patent is hereby corrected as shown below:

COLUMN 3,
Line 12, "is" should read --are--;
Line 13, "a" should be deleted.
Line 44, Close up right margin; and
Line 45, "¶ Reference" should read --Reference--.

COLUMN 4,
Line 4, "confirmed" should read --confirms--.

COLUMN 8,
Line 67, "be also" should read --also be--.

COLUMN 10,
Line 67, "potion" should read --portion--.

COLUMN 12,
Line 19, "claim 11," should read --claim 17,--.

Signed and Sealed this

Third Day of August, 1999

Attest:

Q. TODD DICKINSON

Attesting Officer     Acting Commissioner of Patents and Trademarks